US009535599B2

(12) United States Patent
Kim

(10) Patent No.: US 9,535,599 B2
(45) Date of Patent: Jan. 3, 2017

(54) METHODS AND APPARATUS FOR IMAGE EDITING USING MULTITOUCH GESTURES

(75) Inventor: Nayoung Kim, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1245 days.

(21) Appl. No.: 12/543,385

(22) Filed: Aug. 18, 2009

(65) Prior Publication Data

US 2013/0120434 A1 May 16, 2013

(51) Int. Cl.
*G06F 3/0488* (2013.01)
*G06F 3/041* (2006.01)
*G06T 11/60* (2006.01)
*G06F 3/0481* (2013.01)

(52) U.S. Cl.
CPC ......... *G06F 3/04883* (2013.01); *G06F 3/0416* (2013.01); *G06F 3/0481* (2013.01); *G06T 11/60* (2013.01); *G06F 2203/04808* (2013.01)

(58) Field of Classification Search
CPC ..... G06F 3/04883; G06F 3/0416; G06T 11/60
USPC ........................................ 345/594, 619, 173
See application file for complete search history.

(56) References Cited

U.S. PATENT DOCUMENTS

| | | | | |
|---|---|---|---|---|
| 5,687,306 | A * | 11/1997 | Blank | 345/634 |
| 6,784,896 | B1 * | 8/2004 | Perani et al. | 345/589 |
| 7,030,861 | B1 | 4/2006 | Westerman et al. | |
| 2003/0179214 | A1 * | 9/2003 | Saund et al. | 345/619 |
| 2004/0004626 | A1 * | 1/2004 | Ida et al. | 345/626 |
| 2004/0095357 | A1 * | 5/2004 | Oh et al. | 345/589 |
| 2004/0217975 | A1 * | 11/2004 | Oh et al. | 345/612 |
| 2006/0026521 | A1 | 2/2006 | Hotelling et al. | |
| 2006/0087519 | A1 * | 4/2006 | Berger et al. | 345/619 |
| 2006/0097991 | A1 | 5/2006 | Hotelling et al. | |
| 2006/0238518 | A1 | 10/2006 | Westerman et al. | |
| 2006/0238519 | A1 | 10/2006 | Westerman et al. | |
| 2006/0238520 | A1 | 10/2006 | Westerman et al. | |
| 2006/0238521 | A1 | 10/2006 | Westerman et al. | |
| 2006/0238522 | A1 | 10/2006 | Westerman et al. | |
| 2007/0070050 | A1 | 3/2007 | Westerman et al. | |
| 2007/0070051 | A1 | 3/2007 | Westerman et al. | |

(Continued)

OTHER PUBLICATIONS

"Using Adobe® Photoshop® CS4 for Windows® and Mac OS"; Chapter 8: "Retouching and transforming", section titled "Retouching and repairing images", pp. 201-210; Chapter 18: "Video and animation", section titled "Cloning content in video and animation frames (Photoshop Extended)", pp. 545-546, 2008 Adobe Systems, Incorporated.

*Primary Examiner* — Jonathan Horner
(74) *Attorney, Agent, or Firm* — Wolfe-SBMC

(57) ABSTRACT

Methods and apparatus for digital image editing using multitouch gestures in which two or more digits may be used to select a region of an image via a multitouch device. The number of digits used may indicate the shape of the region being selected. The selected region may be applied to the image or to another image according to an image editing technique using an implement held or manipulated with the other hand, such as a stylus or cursor control device, or using one or more digits of the other hand. Image editing techniques in which the multitouch gestures and application methods may be used may include various techniques that sample pixels from a selected location in an image and apply the sampled pixels to other pixels in the image or to another image.

25 Claims, 23 Drawing Sheets

(56) References Cited

U.S. PATENT DOCUMENTS

| | | | |
|---|---|---|---|
| 2007/0070052 A1 | 3/2007 | Westerman et al. | |
| 2007/0078919 A1 | 4/2007 | Westerman et al. | |
| 2007/0081726 A1 | 4/2007 | Westerman et al. | |
| 2007/0177803 A1 | 8/2007 | Elias et al. | |
| 2007/0177804 A1 | 8/2007 | Elias et al. | |
| 2007/0268302 A1* | 11/2007 | Hsu | 345/589 |
| 2008/0036789 A1* | 2/2008 | de Leon | 345/625 |
| 2008/0297482 A1* | 12/2008 | Weiss | 345/173 |
| 2009/0143141 A1* | 6/2009 | Wells | G07F 17/32 463/37 |
| 2010/0079409 A1* | 4/2010 | Sirotich et al. | 345/175 |
| 2012/0188191 A1* | 7/2012 | Chen et al. | 345/173 |

* cited by examiner

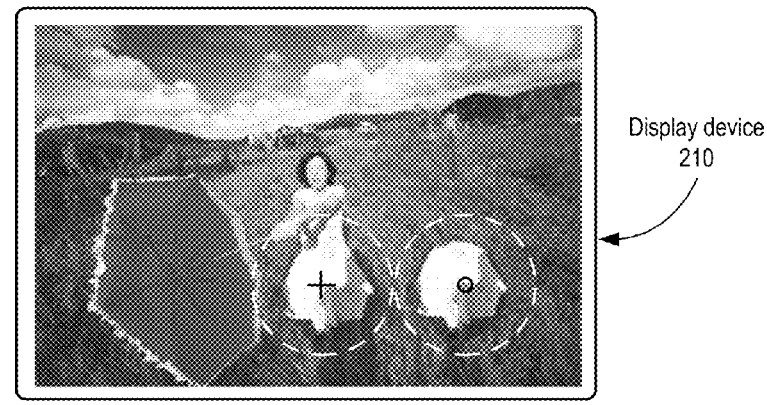
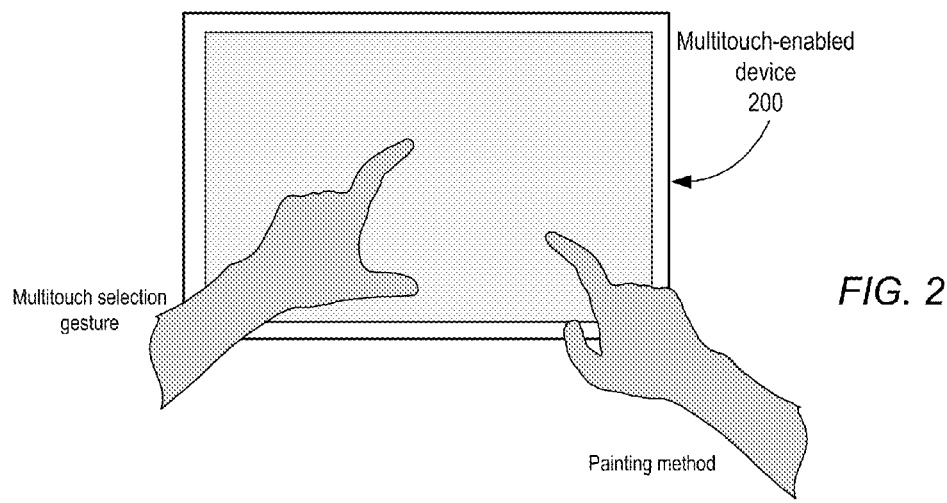
FIG. 2
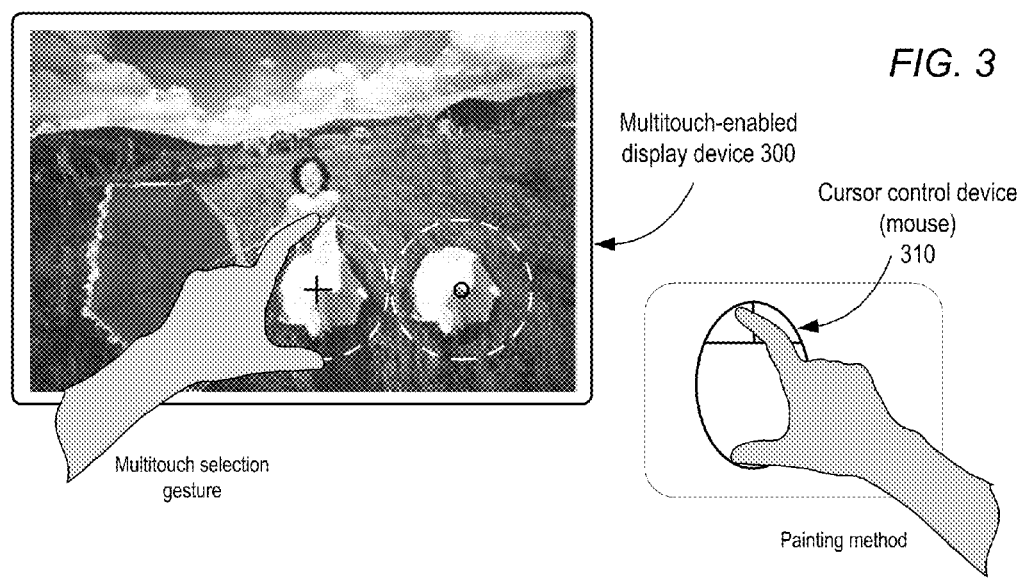
FIG. 3

Multitouch-enabled display device 500

Multitouch-enabled display device 500

*FIG. 5C* Multitouch-enabled display device 500
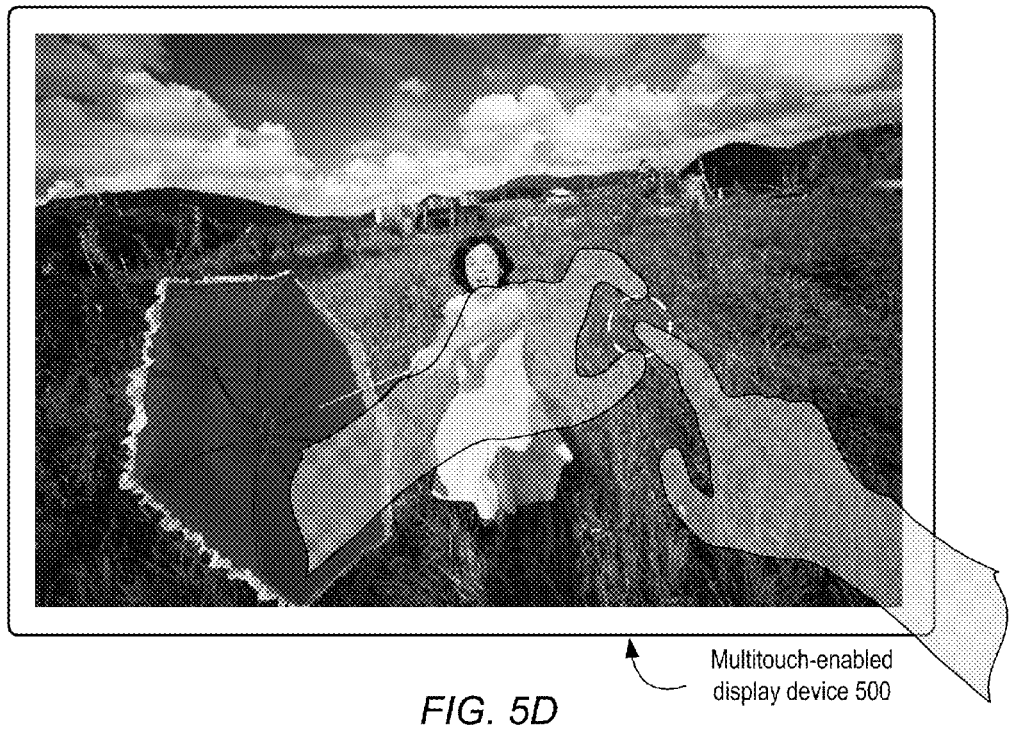
*FIG. 5D* Multitouch-enabled display device 500

FIG. 6A — Multitouch-enabled display device 600
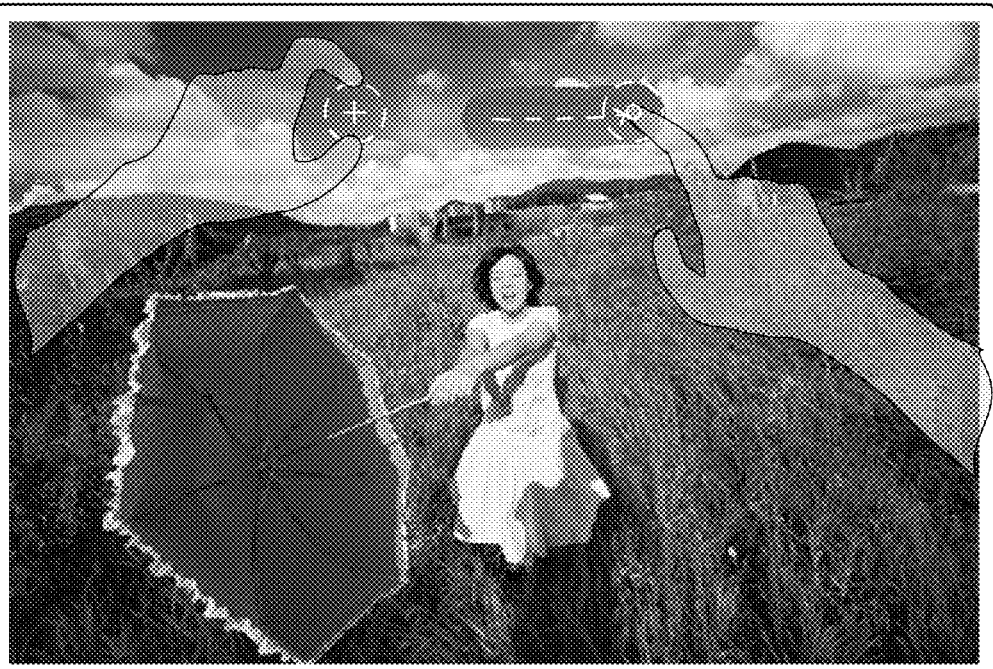
FIG. 6B — Multitouch-enabled display device 600

METHODS AND APPARATUS FOR IMAGE EDITING USING MULTITOUCH GESTURES

BACKGROUND

Description of the Related Art

Multitouch is a technology that provides hardware and software that allows computer users to control various applications via the manipulation of multiple digits on the surface of (or, for some devices, proximate to) a multitouch-enabled device. Multitouch technology generally consists of a touch-enabled device (referred to as a multitouch device) such as a touch-sensitive display device (computer display, screen, table, wall, etc.), touchpad, tablet, etc., as well as software that recognizes multiple, substantially simultaneous touch points on the surface of the multitouch device. Conventional touch-enabled technologies (e.g. a computer touchpad, ATM screen, etc) recognize only one touch point.

Clone Stamp and Other Image Editing Techniques

A clone stamp image editing technique, implemented as a clone stamp tool, may be used to paint one part of an image over another part of an image. A clone stamp technique may, for example, be used to duplicate objects in an image, or to remove defects from an image by copying pixels from another location onto a location of a defect. In conventional implementations of a clone stamp technique, user interactions are performed using cursor control device and keyboard inputs, or combinations thereof (e.g., control-click, option-click, alt-click, etc.) Conventional clone stamp tools may provide the user with the ability to select a brush tip for use with the clone stamp tool, so that the user can control the size of the clone area, by selecting a brush tip using cursor control device and/or keyboard input. In addition, using conventional clone stamp tools, selecting a sampling point involves positioning the pointer (cursor) at a desired location in an image using the cursor control device and performing a keyboard-cursor control device combination. For example, the combination may be an Alt-click in a Microsoft® Windows® (WINDOWS) operating system or an Option-click in an Apple® Macintosh® operating system (MAC OS).

Other image editing techniques similar to the clone stamp technique, such as a healing brush technique and a spot healing technique may be provided by some image editing applications. However, conventional methods for implementing and using these other techniques are similar to those described above for the clone stamp technique: the user interactions of these conventional methods are performed using cursor control device and keyboard inputs, or combinations thereof (e.g., control-click, option-click, alt-click, etc.)

SUMMARY

Various embodiments of methods and apparatus for digital image editing using multitouch gestures are described. In embodiments, two or more digits (e.g., finger(s) and/or thumb) may be used in a multitouch gesture to select a region of a displayed digital image via a multitouch-enabled device (referred to herein as a multitouch device). In some embodiments, the number of digits used to select the region may indicate the geometric shape of the region being selected. For example, in some embodiments, two digits may indicate a circular region, three digits may indicate a triangular region, and four digits may indicate a quadrilateral region or rectangular region. The selected region, which may be referred to as the sampling region, may then be applied to the image, or to another image, according to one or more image editing techniques. The sampling region may include one or more pixels. Typically, but not necessarily, the sampling region will be applied according to an image editing technique using an implement or device held or manipulated with the other hand, such as a stylus or cursor control device, or using one or more digits of the other hand. For example, a stylus or digit may be used to indicate locations in an image to which the sampling region is to be applied by touches and/or strokes of the stylus or digit on the touch-sensitive surface of the multitouch device. Alternatively, a cursor control device may be used to manipulate a cursor displayed on the image to indicate locations in an image to which the sampling region is to be applied. The multitouch gesture used to select a sampling region may be referred to as the selection gesture, while the action(s) used to apply the selected sampling region to an image may be referred to as the painting method. The selection gesture and the painting method may generally be independent of each other; that is, different selection gestures as described may be used in combination with different painting methods.

Image editing techniques in which the selection gestures and painting methods may be used may include various techniques that sample pixels from a selected location in an image and apply the sampled pixels to other pixels in the image or to another image. Several example image editing techniques in which multitouch selection gestures and painting methods may be used are described; however, these examples are not intended to be limiting. A combination of a particular image editing technique with a multitouch selection gesture or gestures and one or more painting methods may be referred to as a gesture-based image editing tool, or simply gesture-based tool. Several example gesture-based tools for applying sampled pixels from one location to other locations (or to the same location) in an image or to a location in another image are described; however, these examples are not intended to be limiting.

Image editing techniques that may be implemented as gesture-based tools in embodiments may include, but are not limited to, clone stamp, implemented as a gesture-based clone stamp tool, healing brush, implemented as a gesture-based healing brush tool, and spot healing, implemented as a spot healing tool. Conventional image editing technologies may provide tools for performing image editing techniques similar to the techniques described herein. However, these tools as conventionally implemented do not leverage the capabilities of multitouch technologies, instead requiring cursor control device (e.g., mouse) and keyboard input and combinations thereof to perform tasks such as region selection. The use of multitouch gestures in the gesture-based tools to perform these tasks may make the gesture-based tools more intuitive and natural than conventional image editing tools.

Some embodiments may provide a gesture-based clone stamp tool that implements a clone stamp technique. In embodiments of a gesture-based clone stamp tool, instead of performing complex and non-intuitive operations involving manipulations of a cursor control device and keyboard input to select brush tips for use with the clone stamp tool and to select a sampling point, the user may simply place two or more digits (e.g., two fingers, or a finger and thumb, of the left hand or of the right hand) on the surface of a multitouch device to select a sampling point. This single multitouch gesture may be used to specify both the location of the sampling point and the size of the sampling region.

Some embodiments may provide a gesture-based healing brush tool that implements a healing brush technique. In embodiments of a gesture-based healing brush tool, instead of performing complex and non-intuitive operations involving manipulations of a cursor control device and keyboard input to select the size of the sampling region and to select a sampling point, the user may simply place two or more digits (e.g., two fingers, or a finger and thumb, of the left hand or of the right hand) on the surface of a multitouch device to select a sampling point. This single multitouch gesture may be used to specify both the location of the sampling point and the size of the sampling region.

Some embodiments may provide a gesture-based spot healing tool that implements a spot healing technique. In embodiments of a gesture-based spot healing tool, instead of performing complex and non-intuitive operations involving manipulations of a cursor control device and keyboard input to select the size of the brush and to select a region to be healed, the user may simply place two or more digits (e.g., two fingers, or a finger and thumb, of the left hand or of the right hand) on the surface of a multitouch device to select a region to be healed. This single multitouch gesture may be used to specify both the location of the region to be healed and the size of the sampling region. In some embodiments, the selected region may be automatically healed in response to this single gesture by appropriately blending pixels within the sampling region. The use of a multitouch gesture to perform the spot healing technique may make the gesture-based spot healing tool more intuitive and natural than conventional spot healing tools.

Some embodiments may provide a gesture-based painting tool that implements a painting technique in which pixels from the sampling region are painted to a painting region around the painting point without the sampling point tracking the movement of the painting point.

A gesture-based image editing module may implement one or more of the gesture-based image editing tools. A gesture-based image editing module may be implemented in any image editing application, including but not limited to Adobe® PhotoShop® and Adobe® After Effects®. A gesture-based image editing module may, for example, be implemented as a stand-alone image editing application, as a module of an image editing application, as a plug-in for applications including image editing applications, and/or as a library function or functions that may be called by other applications.

BRIEF DESCRIPTION OF THE DRAWINGS

FIG. 2 illustrates an example implementation in which an image is displayed on a display device, and multitouch selection gestures and painting methods are performed on a separate multitouch device, according to some embodiments.

FIG. 3 illustrates an example implementation in which multitouch selection gestures are performed on a multitouch device, and painting methods are performed via a separate device such as a cursor control device, according to some embodiments.

FIGS. 5A through 5D illustrate the use of a gesture-based spot healing technique on an example image similar to the one shown in FIG. 1A, displayed on a multitouch-enabled display device, according to some embodiments.

FIGS. 6A and 6B illustrate a gesture-based painting tool in which pixels from the sampling region are painted to a painting region around the painting point without the sampling point tracking the movement of the painting point, according to some embodiments.

Figure 1A:
FIGS. 1A through 1D illustrate the use of a gesture-based clone stamp technique on an example image according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for digital image editing using multitouch gestures are described. In embodiments, two or more digits (e.g., finger(s) and/or thumb) may be used in a multitouch gesture to select a region of a displayed digital image via a multitouch-enabled device (referred to herein as a multitouch device). Typically, but not necessarily, the two or more digits used to select the region will be on the same hand. In some embodiments, the number of digits used to select the region may indicate the geometric shape of the region being selected. For example, in some embodiments, two digits may indicate a circular region, three digits may indicate a triangular region, and four digits may indicate a quadrilateral region or rectangular region. The selected region, which may be referred to as the sampling region, may then be applied to the image, or to another image, according to one or more image editing techniques. The sampling region may include one or more pixels. Typically, but not necessarily, the sampling region will be applied according to an image editing technique using an implement or device held or manipulated with the other hand, such as a stylus or cursor control device, or using one or more digits of the other hand. For example, a stylus or digit may be used to indicate locations in an image to which the sampling region is to be applied by touches and/or strokes of the stylus or digit on the touch-sensitive surface of the multitouch device. Alternatively, a cursor control device may be used to manipulate a cursor displayed on the image to indicate locations in an image to which the sampling region is to be applied.

The multitouch gesture used to select a sampling region may be referred to as the selection gesture, while the action(s) used to apply the selected sampling region to an image may be referred to as the painting method. The selection gesture and the painting method may generally be independent of each other; that is, different selection gestures as described may be used in combination with different painting methods.

Image editing techniques in which the selection gestures and painting methods may be used may include various techniques that sample pixels from a selected location in an image and apply the sampled pixels to other pixels in the image or to another image. Several example image editing techniques in which multitouch selection gestures and painting methods may be used are described; however, these examples are not intended to be limiting. A combination of a particular image editing technique with a multitouch selection gesture or gestures and one or more painting methods may be referred to as a gesture-based image editing tool, or simply gesture-based tool. Several example gesture-based tools for applying sampled pixels from one location to other locations (or to the same location) in an image or to a location in another image are described; however, these examples are not intended to be limiting.

Image editing technologies such as Adobe® PhotoShop® technology and Adobe® After Effects® technology may provide tools for performing image editing techniques similar to the techniques described herein. However, these tools as conventionally implemented do not leverage the capabilities of multitouch technologies, instead requiring cursor control device (e.g., mouse) and keyboard input and combinations thereof to perform tasks such as region selection. The use of multitouch gestures to perform these tasks in the gesture-based tools described herein may make the gesture-based tools more intuitive and natural than conventional image editing tools.

Image editing techniques that may be implemented as gesture-based tools in embodiments may include, but are not limited to, clone stamp, implemented as a gesture-based clone stamp tool, healing brush, implemented as a gesture-based healing brush tool, and spot healing, implemented as a spot healing tool. As noted above, image editing technologies such as Adobe® PhotoShop® technology and Adobe® After Effects® technology may provide conventional tools for performing image editing techniques similar to the techniques described herein. The names used herein for the gesture-based tools may be similar to those typically used for similar tools in the Adobe® applications. Other image editing applications may provide similar conventionally-implemented tools but may use different names for the tools. Embodiments of the gesture-based tools may be implemented in any image editing application, including but not limited to Adobe® PhotoShop® and Adobe® After Effects®.

Gesture-Based Clone Stamp Tool

Some embodiments may provide a gesture-based clone stamp tool that implements a clone stamp technique. In embodiments of a gesture-based clone stamp tool, instead of performing complex and non-intuitive operations involving manipulations of a cursor control device and keyboard input to select brush tips for use with the clone stamp tool and to select a sampling point, the user may simply place two or more digits (e.g., two fingers, or a finger and thumb, of the left hand or of the right hand) on the surface of a multitouch device to select a sampling point. This single multitouch gesture may be used to specify both the location of the sampling point and the size of the sampling region. The use of multitouch gestures to perform the clone stamp technique may make the gesture-based clone stamp tool more intuitive and natural than conventional clone stamp tools.

In some embodiments, the single multitouch gesture may also activate the clone stamp tool. For example, in some embodiments, the user may hold two (or more) digits on the surface of the multitouch device for a specified period (e.g., two seconds) to activate the gesture-based clone stamp tool. Thus, in these embodiments, the user may not have to select the tool from a toolbar or menu to activate the tool; instead, the gesture itself activates the tool. Alternatively, the tool may be previously activated, for example by selecting the clone stamp tool from a toolbar, menu, etc.

In some embodiments, the single multitouch gesture may also be used to specify the shape of the sampling region. For example, in one embodiment, a two-digit multitouch gesture may indicate a circular sampling region, a three-digit multitouch gesture may indicate a triangular sampling region, and a four-digit multitouch gesture may indicate a quadrilateral sampling region. Note that conventional clone stamp tools typically only offer circular brush tips.

In addition, multitouch functionality may be used to dynamically modify a sampling region selected via the multitouch selection gesture. For example, if two digits are used to select a circular sampling region, the user may move the fingers together or apart to dynamically contract or expand the circular sampling region. As another example, if three digits are used to select a triangular sampling region, the user may move the fingers relative to one another to dynamically change the shape and/or size of the triangular sampling region. As yet another example, in some embodiments, the user may be allowed to move the sampling region in the image by simply moving the digits on the surface of the multitouch device.

For images with layers, the gesture-based clone stamp tool may optionally be used to paint part of one layer over another layer. In some applications, the gesture-based clone stamp tool may be used to paint content on video or animation frames. Two different behaviors may be provided as options when stopping and resuming painting using the gesture-based clone stamp tool. A first behavior clones pixels from the most current sampling point when stopping and resuming painting. For example, if the user moves the cursor after stopping painting (indicated by releasing a button on the cursor control device or keyboard), the tool continues to track the cursor's movement with the sampling point. A second behavior restarts cloning from the initial sampling point when stopping and resuming painting. Thus, if the user stops painting, the tool "resets" the sampling point to the initial location. In addition, some embodiments of the gesture-based clone stamp tool may provide blending, opacity and flow settings to control how the "paint" (the pixels from the sampling area) is applied to the cloned (painted) area.

Figure 1B:
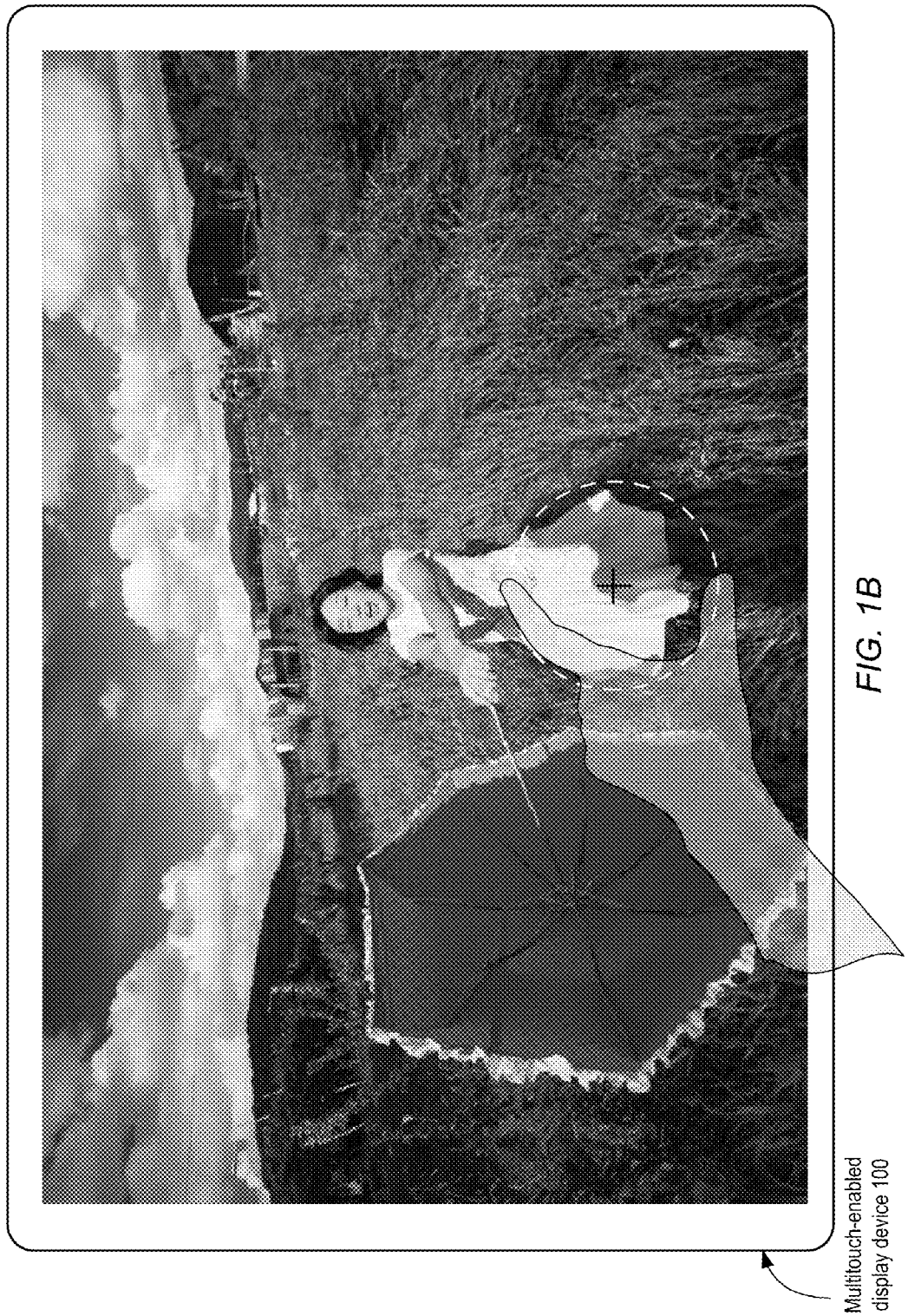
Figure 1C:
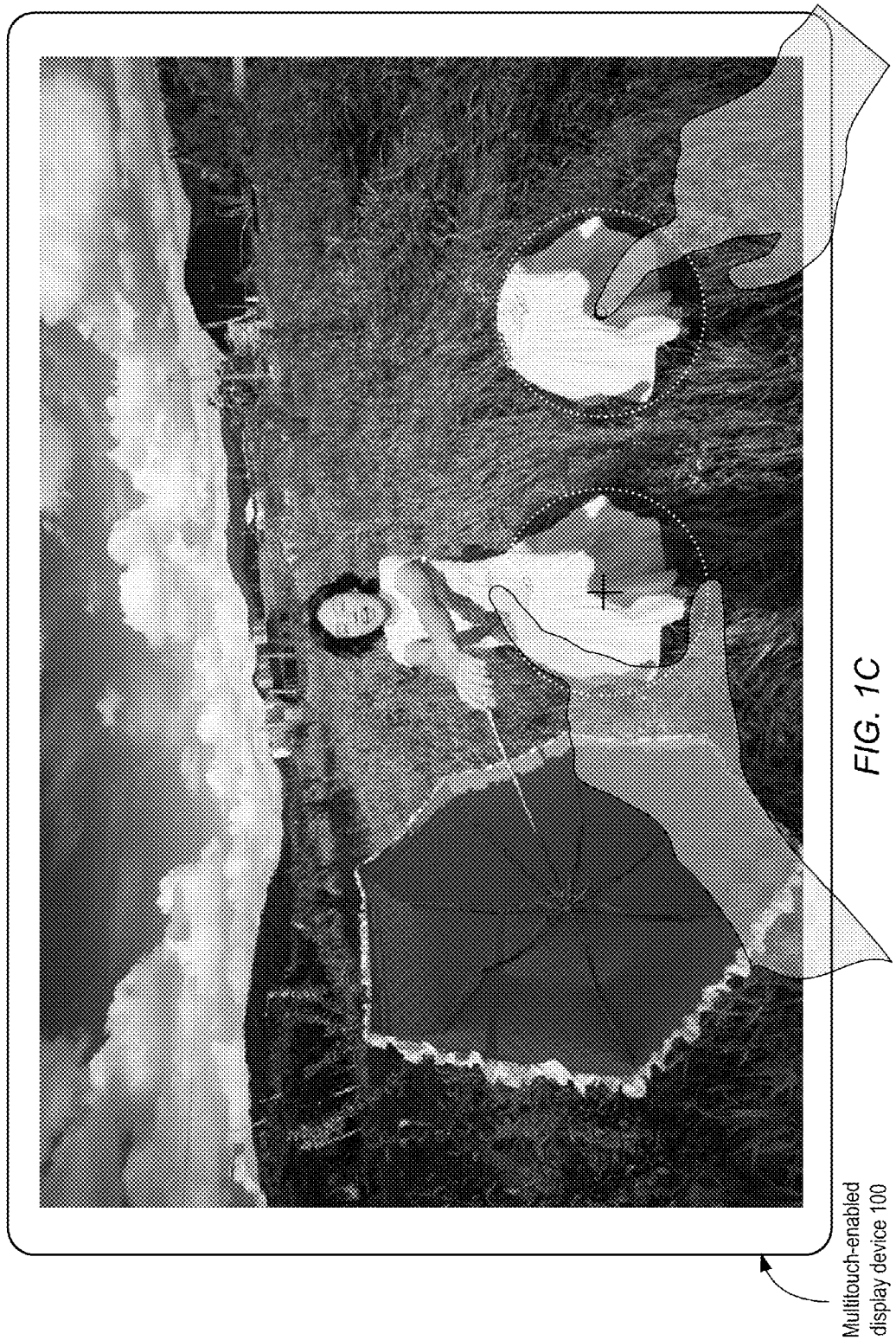
Figure 1D:
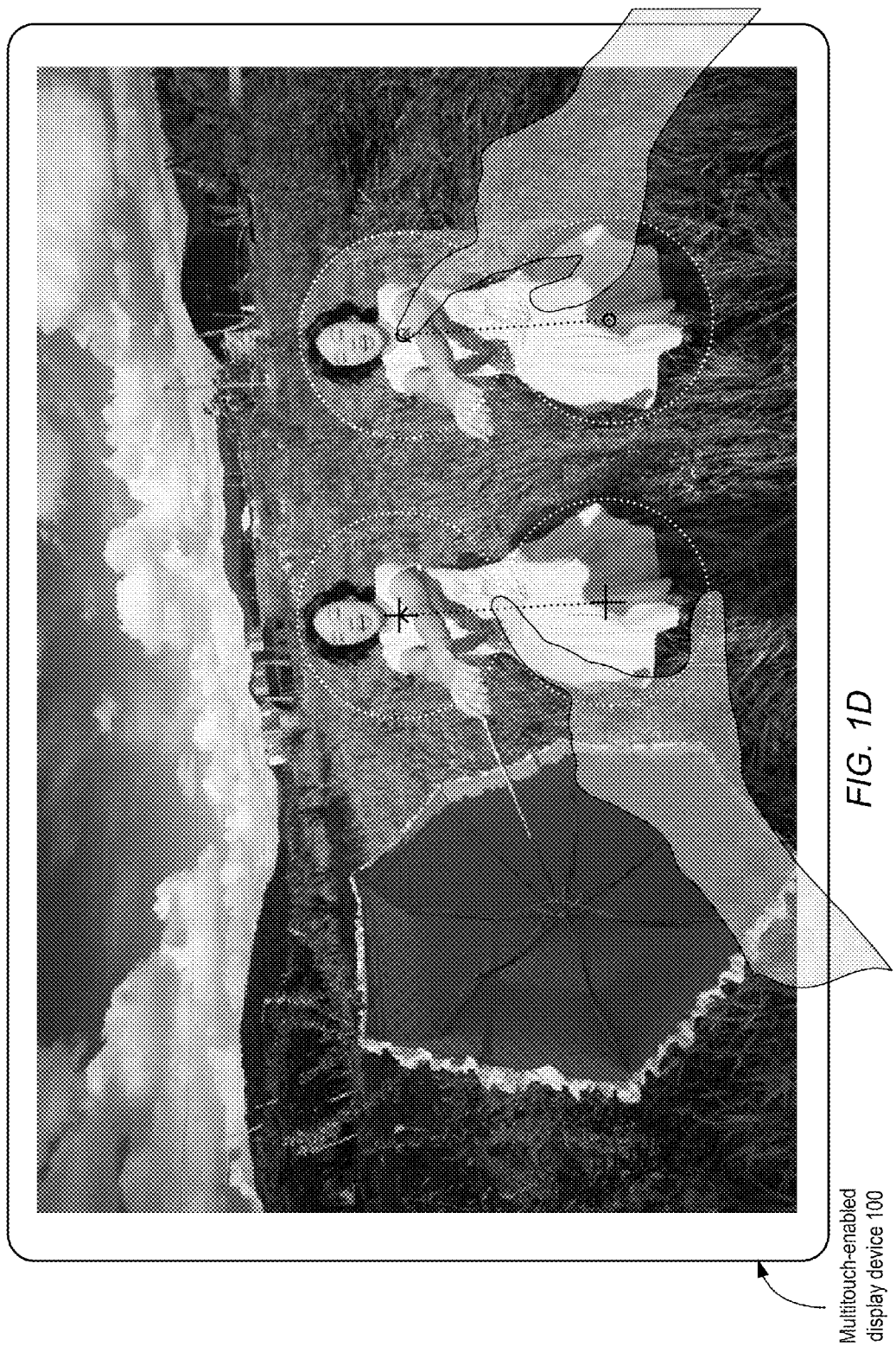

FIGS. 1A through 1D illustrate the use of a gesture-based clone stamp technique on an example image according to some embodiments. A clone stamp technique, implemented as a clone stamp tool, may be used to paint one part of an image over another part of the same image, or over another part of any open document (e.g., another image document, or another video frame) that has the same color mode. A clone stamp technique may, for example, be used to duplicate objects in an image, or to remove defects from an image by copying pixels from another location onto a location of a defect. For example, FIGS. 1B through 1D illustrate using a gesture-based clone stamp tool to clone the girl shown in the original image in FIG. 1A to a destination location on the right of the image. In FIGS. 1A through 1D, the example image is shown displayed on a multitouch-enabled display device 100, and the multitouch gesture and painting method are performed on (or proximate to) the surface of the display device. However, in some implementations, the image(s) may be displayed on a display device, and the multitouch gestures and painting methods may be performed on a separate multitouch device, such as a multitouch-enabled touchpad or tablet, as shown in FIG. 2. In other implementations, the multitouch gestures may be performed on a multitouch device, such as a multitouch-enabled display device, while the painting gestures may be performed via another device, such as a cursor control device, as shown in FIG. 3.

To use the gesture-based clone stamp tool, the user selects a sampling point and region that the user wants to copy (clone) pixels from using a multitouch selection gesture, and then "paints" over another area using a painting method. FIG. 1B shows a selected sampling point as a black cross at the center of the white dashed circle. The white dashed circle illustrates the user-selected sampling region from which pixels are to be cloned. Note that a similar circle (or other shape) and/or crosshair (or other shape) may actually be displayed on the image to provide feedback to the user, or some other visual indication may be provided as feedback. However, the color, thickness, and lines used are given as examples, and are not intended to be limiting. Also note that the multitouch gesture actually specifies the outer boundary of the sampling region; the center of the region may be calculated from the specified boundary according to any of a variety of techniques and used as the sampling point.

FIG. 1B shows the user's index finger and thumb of the left hand performing an example multitouch selection gesture to select a circular sampling region. Note that the user's fingertip and thumb tip would be placed in contact with, or possibly proximate to, the surface of the multitouch device to perform the gesture. FIGS. 1C and 1D illustrate an example of painting with the gesture-based clone stamp tool. FIG. 1C shows a painting method in which the user uses the index finger of the right hand to touch the surface of the multitouch device to begin a painting gesture by selecting the starting point for painting. In FIG. 1C, the small black circle illustrates the selected starting point for painting, referred to as a painting point, and the dotted region illustrates the destination region to which the pixels from the sampling region are cloned or "painted." The destination region may be referred to as the painting region. The painting region may include one or more pixels. The painting region may be, but is not necessarily, the same size and geometry as the sampling region. Note that similar circles or other shapes may actually be displayed on the image to provide feedback to the user, or some other visual indication may be provided as feedback. However, the color, thickness, and lines used are given as examples, and are not intended to be limiting.

In FIG. 1D, the user moves the painting point on a path (indicated by the dotted black line) to perform the painting. When painting, the sampling point may track the motion of the painting point, as shown by the dashed black line; the pixels within the sampling region around the sampling point are cloned or "painted," generally but not necessarily to a similarly sized and shaped painting region around the painting point. While FIGS. 1C and 1D show the user's left hand still performing the sampling gesture, in some embodiments, the user may remove their hand from the multitouch device after selecting the sampling region.

The actions taken by the user to paint from the sampling region to a location on the image (or on another image) may be referred to as the painting method. Typically, but not necessarily, the sampling region will be painted to the destination location(s) using an implement or device held or manipulated with the other hand, such as a stylus or cursor control device, or using one or more digits of the other hand. For example, a stylus held in the other hand, or a digit of the other hand, may be applied to the touch-sensitive surface of the multitouch device to indicate the painting point and to draw the stroke(s) indicating the area to be painted. For example, in FIG. 1C, after the sampling point (and region) are selected using the multitouch gesture, a stylus or digit may be placed on the multitouch device at the location indicated by the small circle to indicate the initial painting point. FIGS. 1C and 1D show the index finger of the user's right hand being used to perform the painting method. The clone stamp tool responsively paints from the sampling region, previously defined by the multitouch gesture, to the painting region around the painting point. The user may then draw the stroke, indicated by the dotted line shown in FIG. 1D, by moving the stylus or finger on the surface of the multitouch device; the clone stamp tool responsively tracks the movement of the painting point (which corresponds to the actual location of the stylus tip or fingertip on the surface) with the sampling point, and paints from the sampling region around the sampling point to the painting region around the painting point.

Alternatively, a cursor control device may be used to manipulate a cursor displayed on the image to indicate locations in the image to which the sampling region is to be applied. For example, in FIG. 1C, after the sampling point (and region) are selected using the multitouch gesture, the cursor may be moved using the cursor control device to the location indicated by the small circle, and a button on the cursor control device (or, alternatively, a button on a keyboard) may be depressed to indicate the initial painting point. The clone stamp tool responsively paints from the sampling region, previously defined by the multitouch gesture, to the painting region around the painting point. The user may then draw the stroke indicate by the dotted line shown in FIG. 1D by manipulating the cursor control device to move the cursor; the clone stamp tool responsively tracks the movement of the painting point (which corresponds to the actual location of the cursor) with the sampling point, and paints from the sampling region around the sampling point to the painting region around the painting point.

While FIGS. 1C, 1D, and 2 show a finger being used in the painting method, a stylus, pen, or other instrument may be used in the painting method in some embodiments. Also, while FIGS. 1A-1D and 2 show the left hand being used to perform the multitouch selection gesture and the right hand being used to perform the painting method, the right hand may be used to perform the multitouch selection gesture and the left hand may be used to perform the painting method. In addition, in some embodiments, the user may remove their digits from the multitouch device after performing the multitouch selection gesture, and thus, in these embodiments, it is possible, but not necessary, for the user to use the same hand (either left or right) to perform both the selection gesture and the painting method.

In FIGS. 1A through 1D, the example image is shown displayed on a multitouch-enabled display device 100, and the multitouch selection gesture and painting method are performed on (or proximate to) the surface of the device. As shown in FIG. 2, in some implementations, the image may be displayed on a display device 210, and the multitouch selection gesture and painting method may be performed via a separate multitouch-enabled device 200, such as a multitouch-enabled touchpad or tablet. As shown in FIG. 3, in some implementations, the image may be displayed on a multitouch-enabled display device 300, and the multitouch selection gesture may be performed on the display device 300, while the painting method may be performed via a cursor control device 310. While FIG. 3 shows a mouse being used as a cursor control device, other devices, such as trackballs, touchpads, and even keyboards, may be used as the cursor control device 310.

While not shown, implementations are also possible where the image(s) are displayed on a display device as shown in FIG. 2, the multitouch selection gesture is performed via a separate multitouch-enabled device as shown in FIG. 2, and the painting method is performed via a cursor control device as shown in FIG. 3.

Some multitouch devices may support proximity detection. In other words, these devices may be able to detect when an object, such as a finger or stylus, is within some threshold distance of the surface of the device without actually being in contact with the surface. Some embodiments of the gesture-based clone stamp tool, and of the other gesture-based tools described herein, may leverage this proximity detection capability, when provided, to detect multitouch gestures, such as the selection gestures described for the gesture-based clone stamp tool, and/or painting methods, such as the painting methods described for the gesture-based clone stamp tool, based on proximity to the surface of the multitouch device rather than, or in addition to, actual contact with the surface.

Gesture-Based Healing Brush Tool

A healing brush technique allows the user to correct imperfections in images. The healing brush technique is similar to the clone stamp technique in that it allows the user paint with sampled pixels from a sampling region to a destination location. However, while the clone stamp technique generally paints over the destination location with the sampled pixels, the healing brush technique matches the texture, lighting, transparency, and shading of the sampled pixels to the pixels being "healed." As a result, the repaired pixels are blended into the rest of the image. However, conventional methods for implementing and using a healing brush tool to implement the healing brush technique are similar to those for the conventional clone stamp tool previously described. Like conventional clone brush tools, the user interactions of conventional healing brush tools are performed using cursor control device and keyboard inputs, or combinations thereof (e.g., control-click, option-click, alt-click, etc.)

Some embodiments may provide a gesture-based healing brush tool that implements a healing brush technique. In embodiments of a gesture-based healing brush tool, instead of performing complex and non-intuitive operations involving manipulations of a cursor control device and keyboard input to select the size of the sampling region and to select a sampling point, the user may simply place two or more digits (e.g., two fingers, or a finger and thumb, of the left hand or of the right hand) on the surface of a multitouch device to select a sampling point. This single multitouch gesture may be used to specify both the location of the sampling point and the size of the sampling region. The use of multitouch gestures to perform the healing brush technique may make the gesture-based healing brush tool more intuitive and natural than conventional healing brush tools.

Thus, embodiments of a gesture-based healing brush tool may be implemented that are similar to embodiments of the gesture-based clone stamp tool as previously described, with the difference being that the healing brush technique implemented by the gesture-based healing brush tool applies sampled pixels to the paint region differently than the clone stamp technique implemented by the gesture-based clone stamp tool. As noted above, instead of painting over destination pixels with sampled pixels, the healing brush technique matches the texture, lighting, transparency, and shading of the sampled pixels to the pixels being healed to facilitate blending the region being repaired into the rest of the image.

Figure 4:
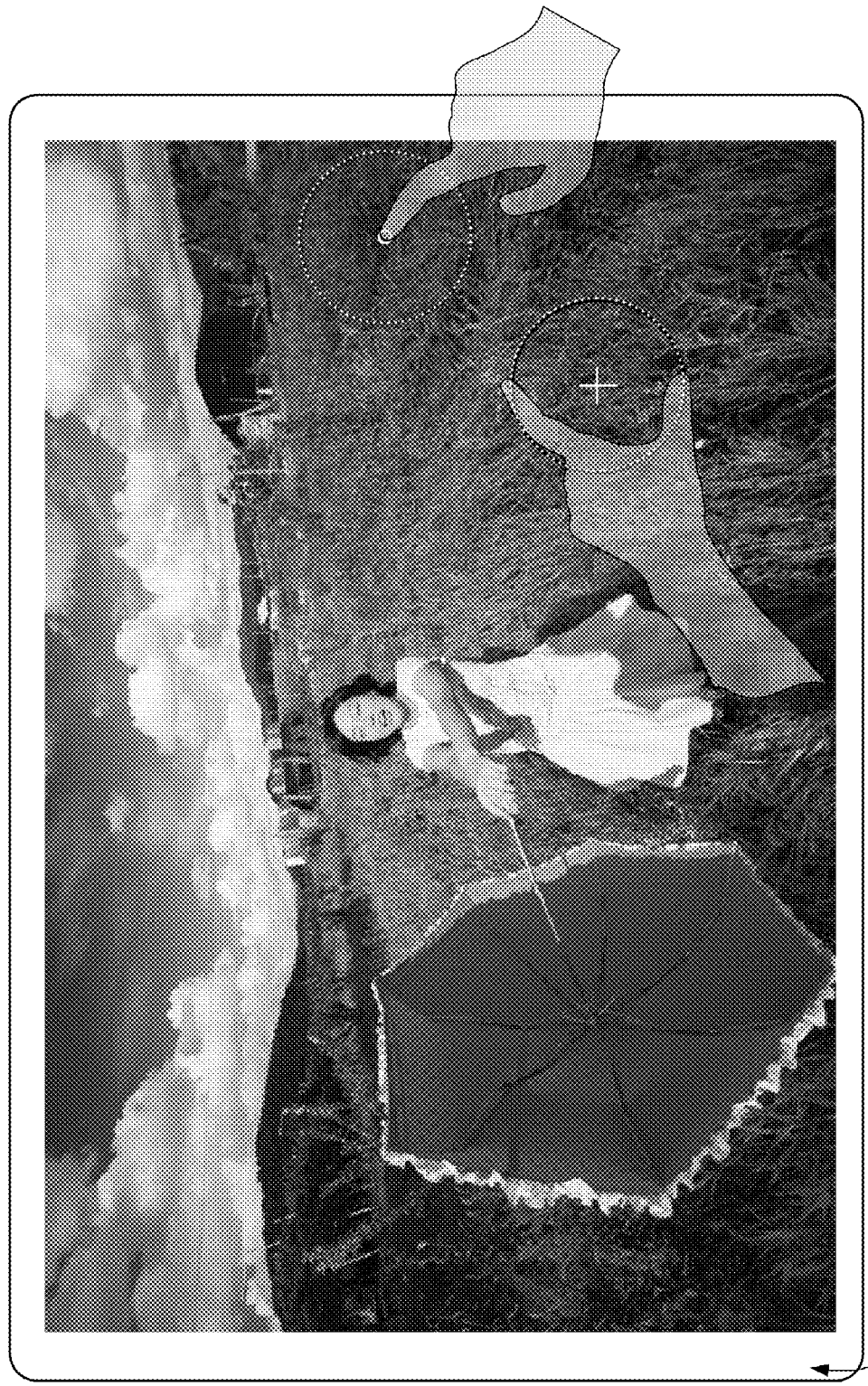
FIG. 4 illustrates the use of a gesture-based healing brush technique on the example image from FIG. 1A, displayed on a multitouch-enabled display device, according to some embodiments.

FIG. 4 illustrates the use of a gesture-based healing brush technique on the example image from FIG. 1A, displayed on a multitouch-enabled display device 400, according to some embodiments. FIG. 4 shows the user's index finger and thumb of the left hand performing an example multitouch selection gesture to select a circular sampling region, indicated by the dashed white circle, with the white cross in the middle representing the sampling point. In this example, the user uses the index finger of the right hand to touch the surface of the multitouch device to begin a blending gesture by selecting the starting point for blending using the healing brush technique. The small white circle illustrates the selected starting point for blending, referred to as a blending point, and the dotted white circle illustrates the destination region to which the pixels from the sampling region are to be blended. The destination region may be referred to as the blending region. The blending region may be, but is not necessarily, the same size and geometry as the sampling region. The user may then, if desired, move the blending point on a path to perform a blending stroke. During the blending stroke, the sampling point may track the motion of the blending point; the pixels within the sampling region around the sampling point are blended with the pixels in the blending region, generally but not necessarily to a similarly sized and shaped region, around the blending point.

The various implementations of a gesture-based clone stamp tool, for example as illustrated in FIGS. 1A through 1D, 2 and 3, apply equally to the gesture-based healing brush tool.

Gesture-Based Spot Healing Technique

A spot healing technique removes blemishes and other imperfections from images. The spot healing technique works similarly to the healing brush technique in that it paints with sampled pixels from an image and matches the texture, lighting, transparency, and shading of the sampled pixels to the pixels being healed. However, unlike the healing brush technique, the spot healing technique does not require the user to specify a separate sampling region and blending region. Instead, the spot healing technique automatically samples from within or around a selected region to be retouched.

The following describes a conventional method for implementing and using a spot healing technique. The user interactions of this conventional method are performed using cursor control device and keyboard inputs, or combinations thereof (e.g., control-click, option-click, alt-click, etc.)

The user selects the spot healing tool, for example by selecting the tool from a menu or a palette using a cursor control device (e.g., a mouse) and/or keyboard.

The user selects a brush size, for example from a palette or menu, using cursor control device and/or keyboard input. A brush that is slightly larger than the area the user wants to retouch generally works best so that the user can cover the entire area with one click.

The user selects the spot to be healed by positioning the pointer (cursor) at the desired location on the image using the cursor control device, and performing a keyboard-cursor control device combination. For example, the combination may be an Alt-click in a Microsoft® Windows (WINDOWS) operating system or an Option-click in an Apple® Macintosh® operating system (MAC OS).

The user may drag the cursor using the cursor control device to repair imperfections in a larger area, if desired.

Thus, conventional methods for implementing and using a spot healing tool to implement the spot healing technique are similar to those for the conventional clone stamp and healing brush tools previously described in that the user interactions of conventional spot healing tools are performed using cursor control device and keyboard inputs, or combinations thereof (e.g., control-click, option-click, alt-click, etc.)

Some embodiments may provide a gesture-based spot healing tool that implements a spot healing technique. In embodiments of a gesture-based spot healing tool, instead of performing complex and non-intuitive operations involving manipulations of a cursor control device and keyboard input to select the size of the brush and to select a region to be healed, the user may simply place two or more digits (e.g., two fingers, or a finger and thumb, of the left hand or of the right hand) on the surface of a multitouch device to select a region to be healed. This single multitouch gesture may be used to specify both the location of the region to be healed and the size of the sampling region. In some embodiments, the selected region may be automatically healed in response to this single gesture by appropriately blending pixels within the sampling region. The use of a multitouch gesture to perform the spot healing technique may make the gesture-based spot healing tool more intuitive and natural than conventional spot healing tools.

Thus, embodiments of a gesture-based spot healing tool may be implemented that are similar to embodiments of the gesture-based spot healing tool and gesture-bases healing brush tool as previously described, with the difference being that the spot healing technique implemented by the gesture-based spot healing tool applies sampled pixels from the selected region to the area to be healed without having to separately select a painting region or blending region. Also, as noted above, instead of painting over destination pixels with sampled pixels as in the clone stamp technique, the spot healing technique, like the healing brush technique, matches the texture, lighting, transparency, and shading of the sampled pixels to the pixels being healed to facilitate blending the region being repaired into the rest of the image.

Figure 5A:
Figure 5B:
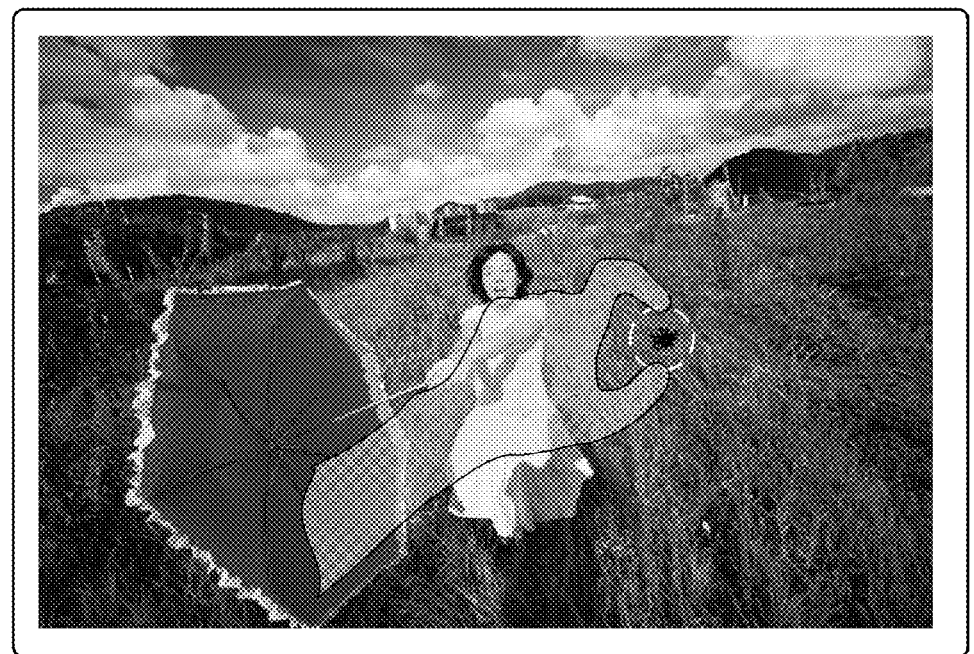

FIGS. 5A through 5D illustrate the use of a gesture-based spot healing technique on an example image similar to the one shown in FIG. 1A, displayed on a multitouch-enabled display device 500, according to some embodiments. In the example image shown in FIG. 5A, there is an obvious blemish in the grass to the right of the girl. In FIG. 5B, the user's index finger and thumb of the left hand are used to perform an example multitouch selection gesture to select a circular region, indicated by the dashed white circle, around the blemish. In FIG. 5C, the spot healing tool has automatically healed the blemish by blending pixels within the selected region. In some embodiments, the single multitouch gesture may also activate the spot healing tool. For example, in some embodiments, the user may hold two (or more) digits on the surface of the multitouch device for a specified period (e.g., two seconds) to activate the gesture-based spot healing tool. Thus, in these embodiments, the user may not have to select the tool from a toolbar or menu to activate the tool; instead, the gesture itself activates the tool. Alternatively, the tool may be previously activated, for example by selecting the spot healing tool from a toolbar, menu, etc.

As shown in FIG. 5D, as an alternative to automatically performing spot healing in response to the multitouch gesture that selects the region, the user may first select the region, for example using two or more digits on one hand, and then touch the surface of the multitouch device with a finger, stylus, or other implement within the selected region to perform the spot healing.

The user may move the digits on the surface of the multitouch device to repair imperfections in a larger area, if desired. The spot healing method is applied to the region indicated by the indexes and the movement.

Other Gesture-Based Image Editing Techniques

In the gesture-based clone stamp tool, the sampling point tracks movement of the painting point. Similarly, in the gesture-based healing brush tool, the sampling point tracks movement of the blending point. However, the gesture-based methods for implementing these tools as described herein may be applied to other painting or blending methods that use similar selection and painting techniques. For example, some embodiments may provide a gesture-based painting tool that implements a painting technique in which pixels from the sampling region are painted to a painting region around the painting point without the sampling point tracking the movement of the painting point.

FIGS. 6A and 6B illustrate a gesture-based painting tool in which pixels from the sampling region are painted to a painting region around the painting point without the sampling point tracking the movement of the painting point, according to some embodiments. FIG. 6A shows the user's index finger and thumb of the left hand performing an example multitouch selection gesture to select a circular sampling region, indicated by the dashed white circle, with the white cross in the middle representing the sampling point. The user uses the index finger of the right hand to touch the surface of the multitouch device to begin a painting method by selecting the starting point for painting. The small white circle illustrates the selected starting point for painting, referred to as a painting point, and the dotted white circle illustrates the destination region to which the pixels from the sampling region are to be painted. The destination region may be referred to as the painting region. The painting region may be, but is not necessarily, the same size and geometry as the sampling region. The user may then, if desired, move the painting point on a path to perform a painting stroke. However, during the painting stroke, unlike the clone brush tool and the healing brush tool, the sampling point does not track the motion of the painting point; the pixels within the sampling region around the stationary sampling point are painted to the painting region around the painting point. In some embodiments, the user may move or otherwise manipulate the fingers performing the multitouch selection gesture to modify the size, shape and/or location of the sampling region while performing the painting method with the other hand.

The various implementations of a gesture-based clone stamp tool, for example as illustrated in FIGS. 1A through 1D, 2 and 3, apply equally to the gesture-based painting tool as illustrated in FIGS. 6A and 6D, with the exception that the sampling point does not track the motion of the painting point when using the gesture-based painting tool.

Figure 7:
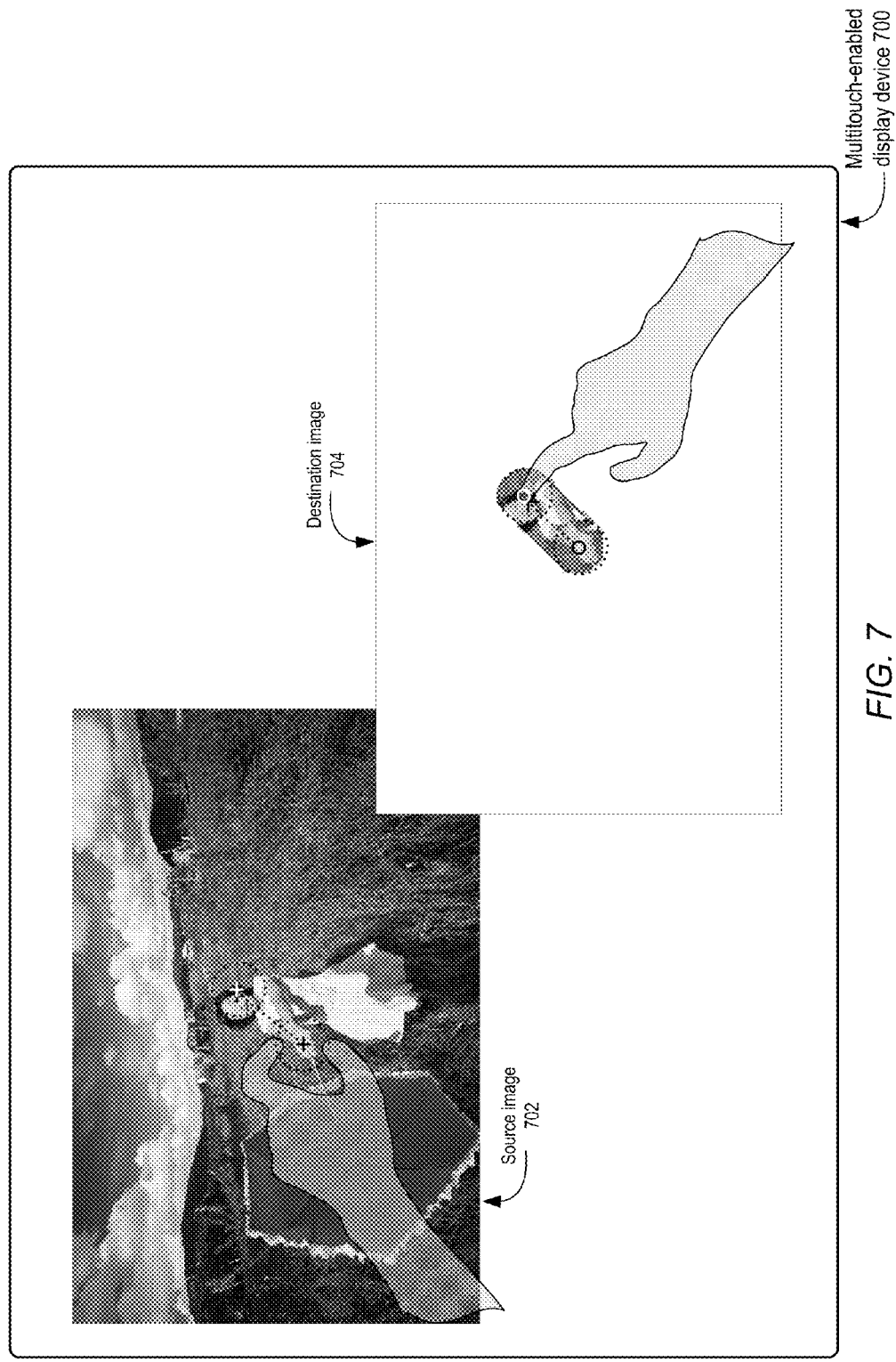
FIG. 7 shows a multitouch selection gesture performed in one image to select a sampling region, with the painting method performed in another image to apply pixels from the sampling region in the first image to the painting region in the second image, according to some embodiments.

With the exception of the gesture-based spot healing tool, in all of the gesture-based image editing tools described above, a multitouch gesture may be used to perform a selection in one image, with the painting (or blending) method performed in another image. As an example, FIG. 7 shows a multitouch-enabled display device 700 displaying a source image 702 and a destination image 704. In this example, a gesture-based clone stamp tool is used to clone a portion of source image 702 into destination image 704. The user is shown performing a multitouch selection gesture to select the sampling region in source image 702, and a painting method to clone pixels from the source image 702 into a painting region of the destination image 704.

FIGS. 8A through 8E, 9A and 9B, and 10A through 10C illustrate various examples of operations of and implementations of a user interface to a gesture-based image editing module that may be used to implement one or more of the various gesture-based image editing tools as described herein. A gesture-based image editing module may be implemented in any image editing application, including but not limited to Adobe® PhotoShop® and Adobe® After Effects®. A gesture-based image editing module may, for example, be implemented as a stand-alone image editing application, as a module of an image editing application such as Adobe® PhotoShop® and Adobe® After Effects, as a plug-in for applications including image editing applications such as Adobe® PhotoShop® and Adobe® After Effects®, and/or as a library function or functions that may be called by other applications. Note that Adobe® PhotoShop® and Adobe® After Effects® are given as examples, and are not intended to be limiting.

Figure 8A:
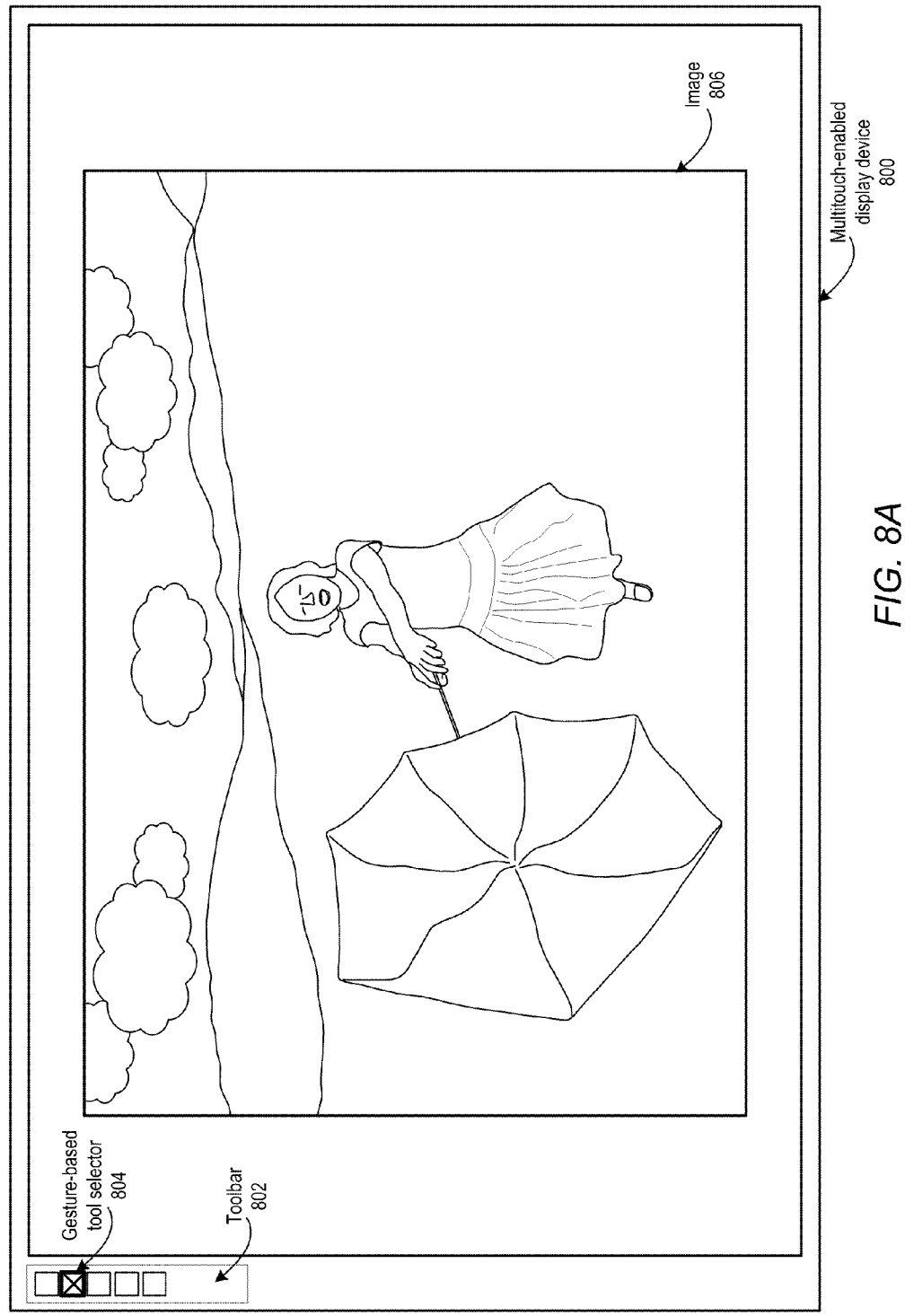
FIGS. 8A through 8E illustrate a multitouch gesture using two digits which indicates a circular sampling region and painting region, according to some embodiments.

FIG. 8A shows a multitouch-enabled display device 800 displaying an image 806. In some embodiments, a toolbar 802 of an image editing application may also be displayed. The toolbar 802 may include one or more user interface items from which the user may select various functions of the image editing application. For example, the toolbar may include one or more selector elements via which the user may select or activate the various multitouch gesture-based tools as described herein, such as a gesture-based clone stamp tool, a gesture-based healing brush tool, a gesture-based spot healing tool, and a gesture-based painting tool. FIG. 8A shows a gesture-based tool selector 804 as selected. In some embodiments, the user may activate a tool by touching the multitouch-enabled display device 800 at the desired selector 804. Other methods for activating a tool may be used; for example, a cursor control device may be used to move a cursor to a desired selector in toolbar 802 and to click on the selector. In some embodiments, a multitouch gesture on image 806 may be used activate a gesture-based tool.

Figure 8B:
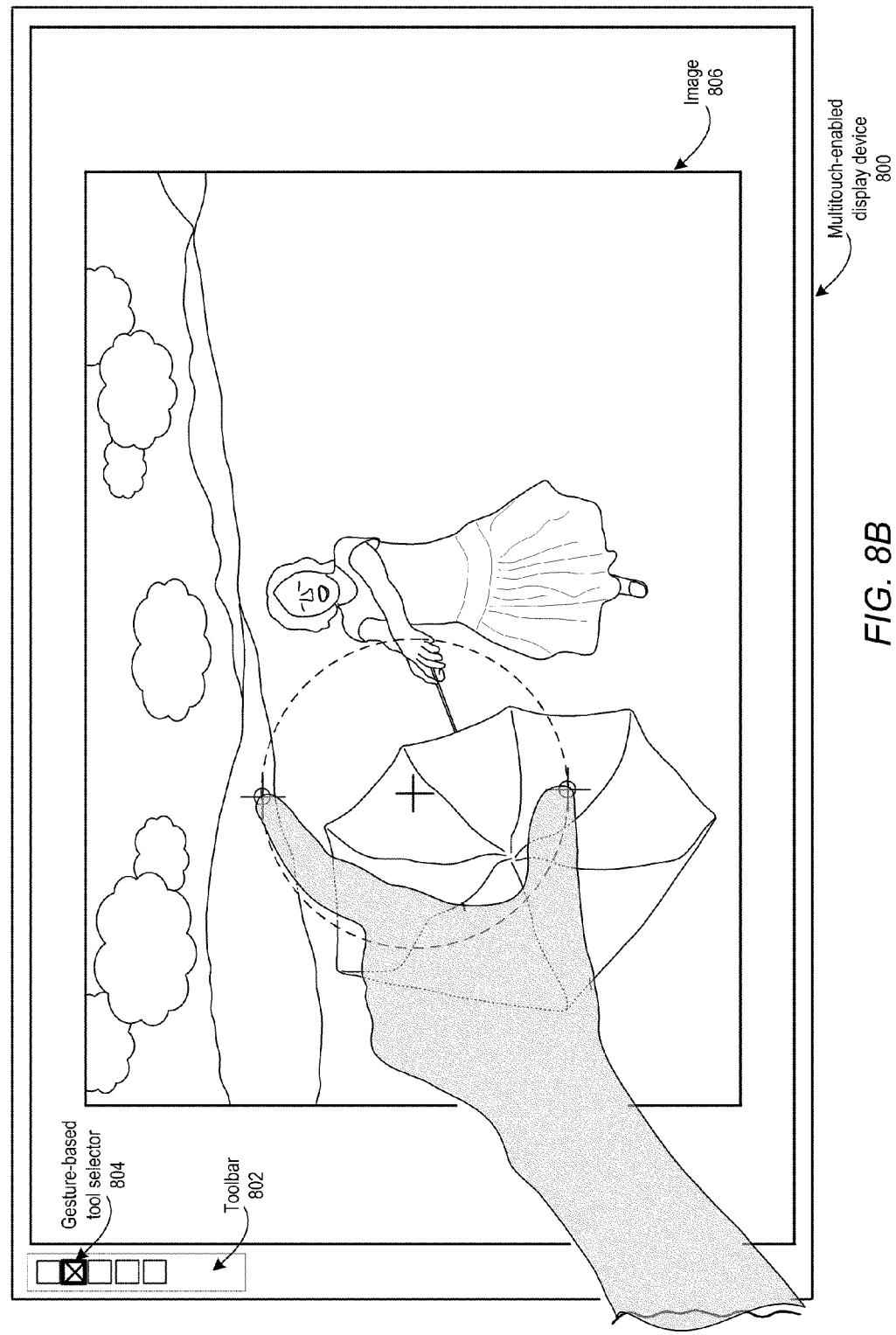
Figure 8C:

In FIG. 8B, the user has used two digits to select a circular sampling region, indicated by the dashed circle, by touching the surface of the multitouch-enabled display device 800 with the tips of the index finger and thumb of the left hand. As previously mentioned, some multitouch-enabled devices may be able to detect objects that are proximate to the surface in addition to objects that are touching the surface. Some embodiments, in combination with such devices, may thus detect the multitouch gesture when the user's digits are proximate to the surface instead of or in addition to when the user's digits are in contact with the surface. The gesture-based tool may determine the sampling point, indicated by the cross at the center of the circle, from the selected sampling region. In some embodiments, the user may further manipulate the selected region; for example, the user may move the fingers in various directions on the surface, and/or may move the fingers closer together or farther apart on the surface. In FIG. 8C, for example, the user has moved the finger and thumb closer together to indicate a smaller sampling region, and has shifted the position of the sampling region and sampling point.

Figure 8D:
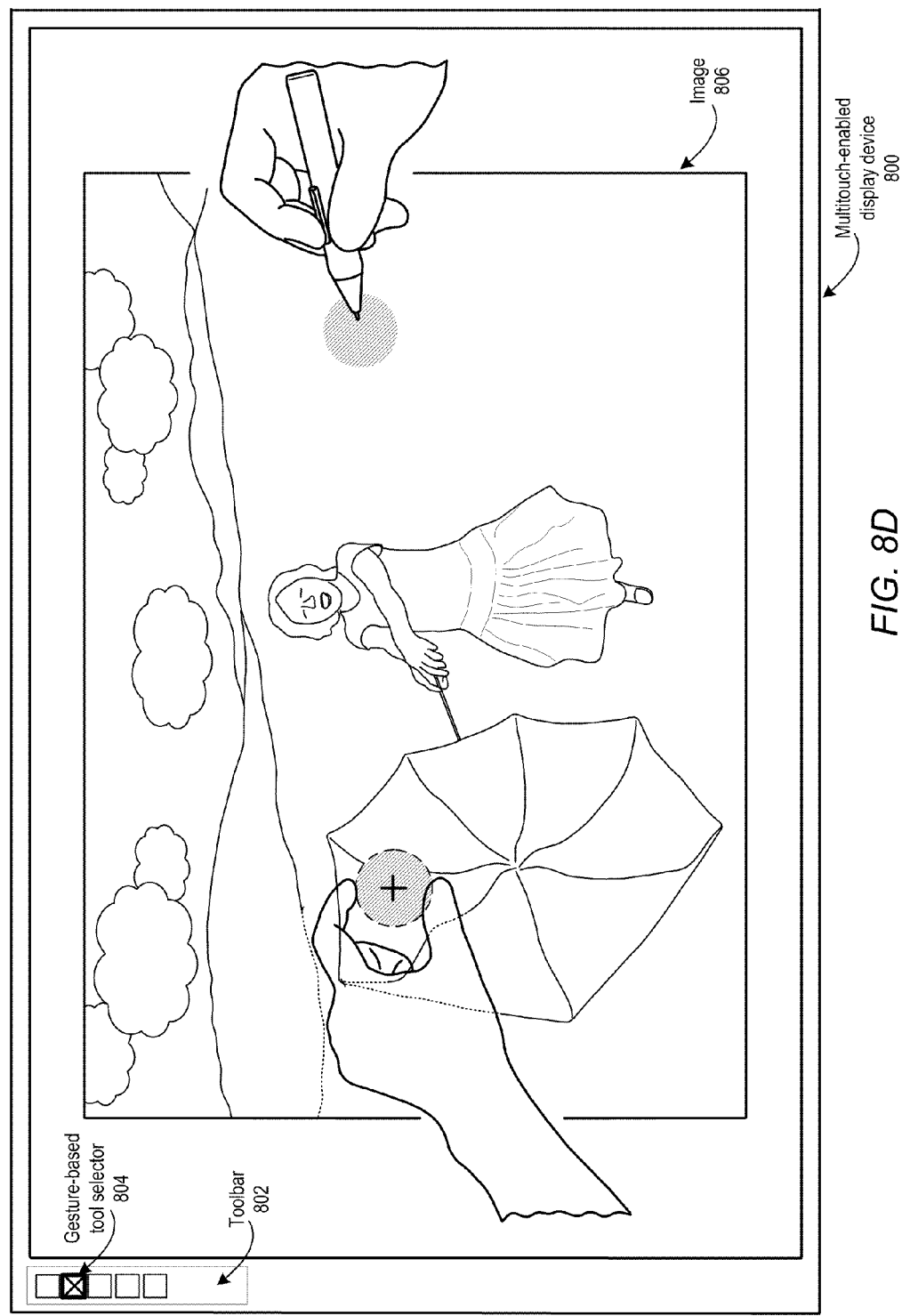

FIG. 8D shows a painting method in which the user applies a stylus held in the right hand to the surface of the multitouch-enabled display device 800 to select a painting point and painting region around the point. In some embodiments, the user may have to hold the stylus (or other implement, such as a finger) on the surface for a period, for example two seconds, before the painting method activates. While this example shows a stylus being used to perform the painting method, other techniques may be used in some embodiments, such as a cursor manipulated with a cursor control device, to perform the painting method. Some multitouch-enabled devices may be able to detect objects that are proximate to the surface in addition to objects that are touching the surface. Some embodiments, in combination with such devices, may thus detect the stylus (or other implement) when the implement is proximate to the surface instead of or in addition to when the implement is in contact with the surface. When the painting method activates, pixels from the sampling region are applied to the painting region according to the image editing technique implemented by the selected gesture-based tool. For example, if the technique is the clone stamp technique, pixels are cloned from the sampling region to the painting region. As another example, if the technique is the healing brush technique, pixels from the sampling region are blended with pixels in the painting (or blending) region.

Figure 8E:
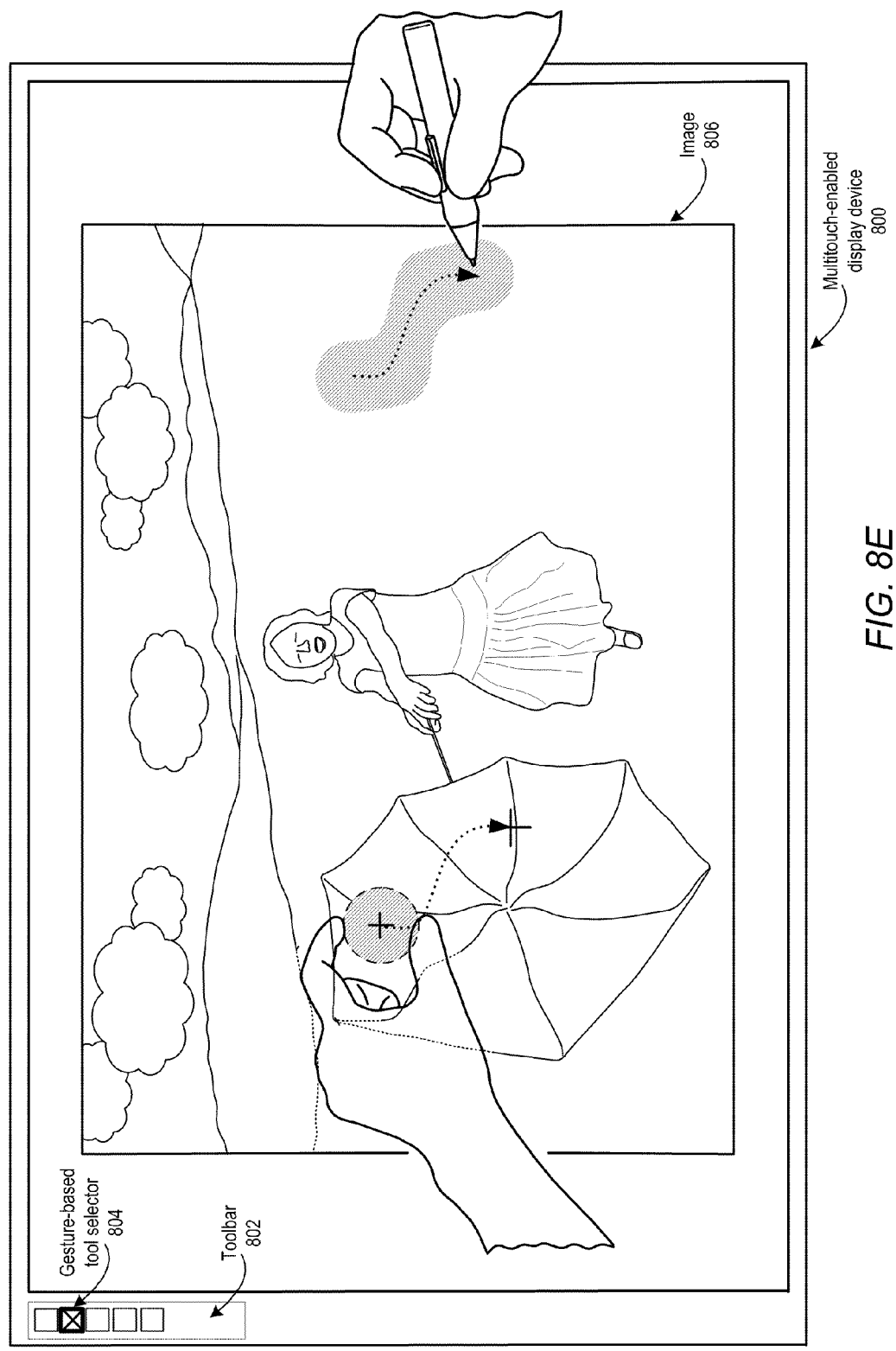

In FIG. 8E, the user has drawn a curve on the image, indicated by the dotted line, using the stylus applied to the surface of the multitouch-enabled display device 800. FIG. 8E shows that the sampling point (and sampling region) tracks the motion of the painting point in the image, as indicated by the dashed line. Pixels from the sampling region are applied to the painting region according to the image editing technique implemented by the active gesture-based tool as the stylus is moved on the surface.

Figure 9A:
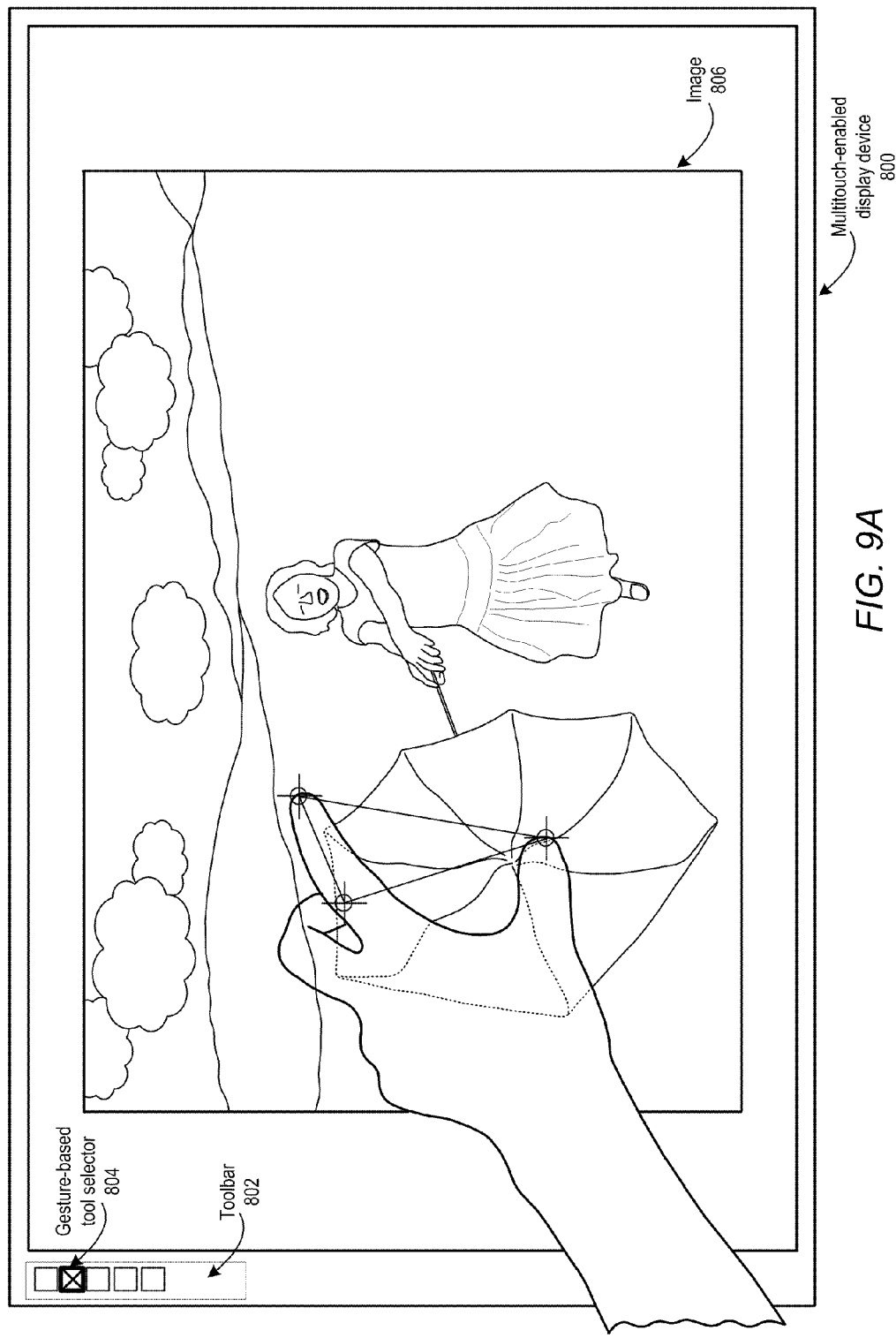
FIGS. 9A and 9B illustrate a multitouch gesture using three digits, for example two fingers and a thumb, which indicates a triangular sampling region and painting region, according to some embodiments.
Figure 9B:
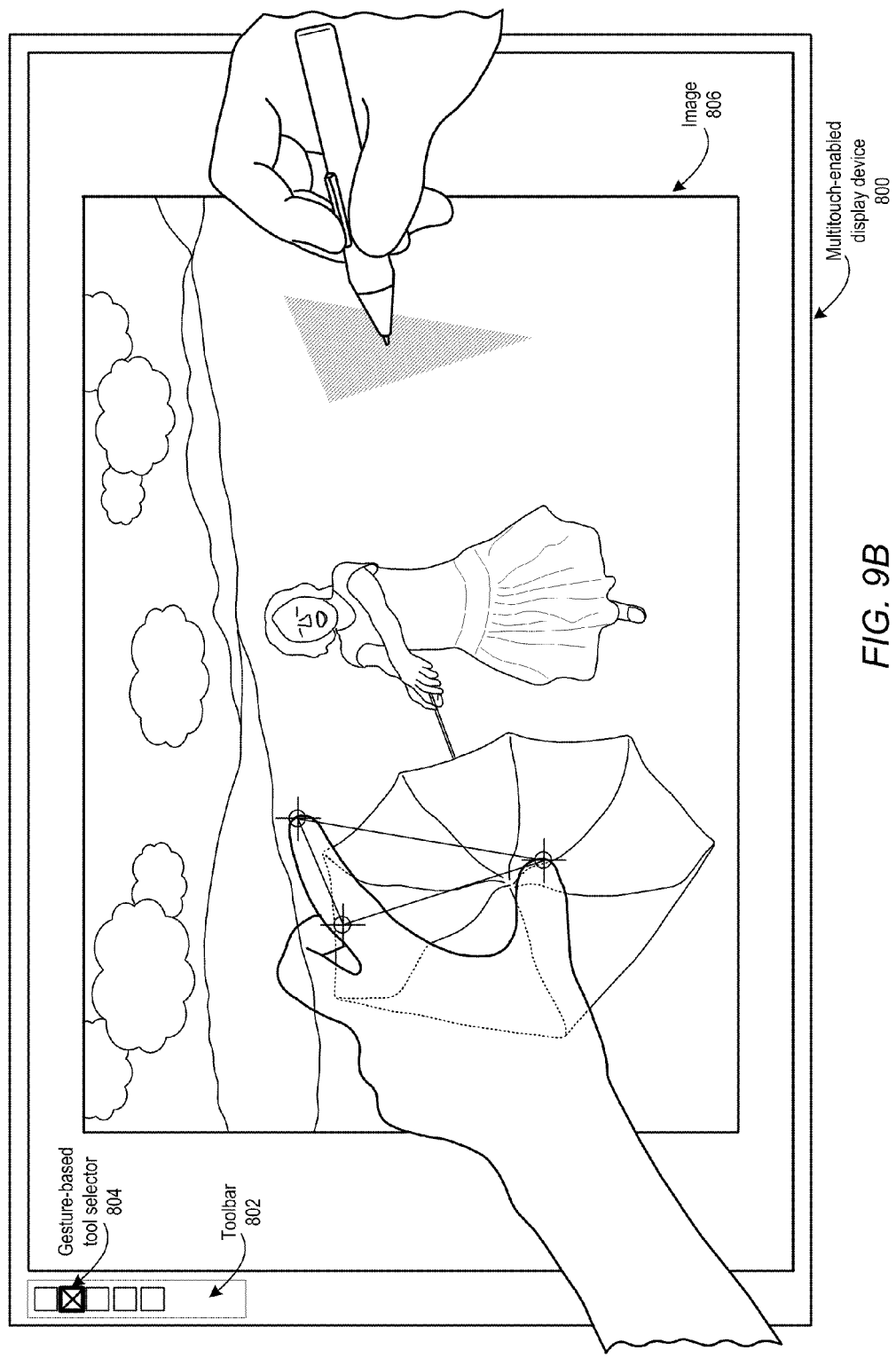
Figure 10A:
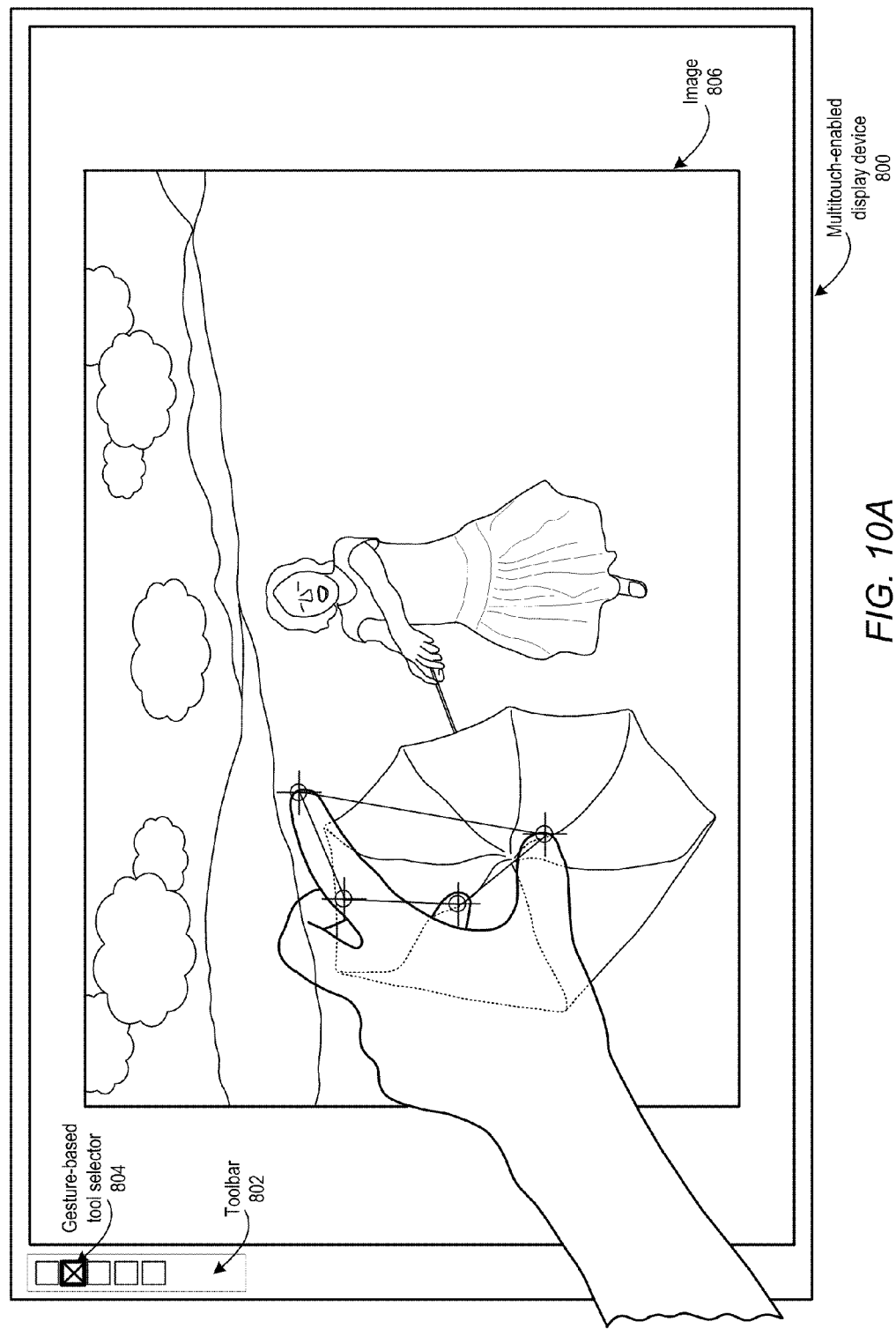
FIGS. 10A through 10C illustrate a multitouch gesture using four digits, for example three fingers and a thumb, which indicates a quadrilateral sampling region and painting region, according to some embodiments.
Figure 10B:
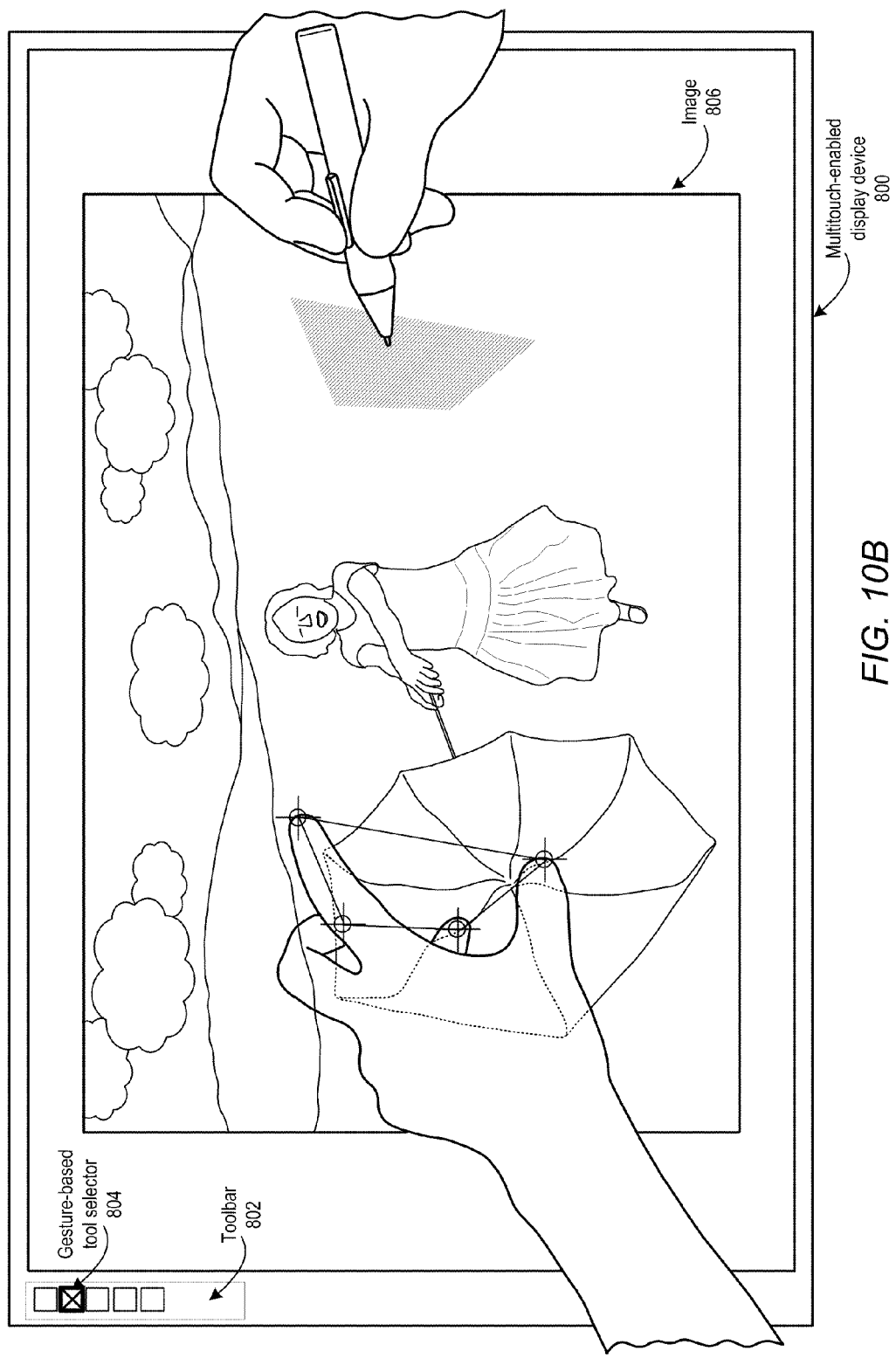
Figure 10C:
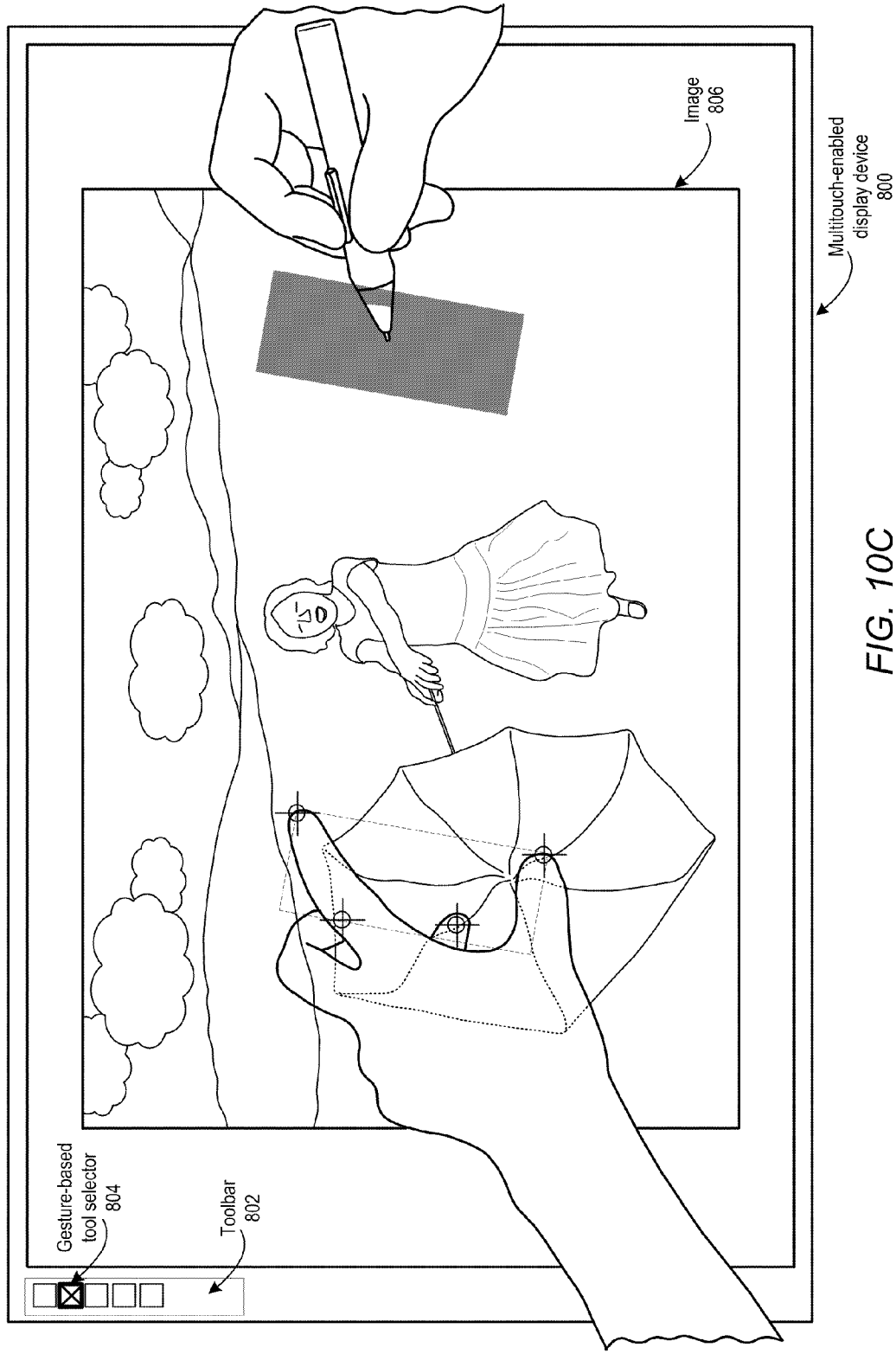

FIGS. 8A through 8E illustrate a multitouch gesture using two digits which indicates a circular sampling region and painting region. FIGS. 9A and 9B illustrate a multitouch gesture using three digits, for example two fingers and a thumb. In some embodiments, as shown in FIGS. 9A and 9B, a multitouch gesture performed with three digits may indicate a triangular sampling region and painting region are to be used. FIGS. 10A through 10C illustrate a multitouch gesture using four digits, for example three fingers and a thumb. In some embodiments, as shown in FIGS. 10A through 10C, a multitouch gesture performed with four digits may indicate a quadrilateral or rectangular sampling region and painting region are to be used. FIG. 10B shows the sampling region and painting region as a quadrilateral that conforms to the points indicated by the users' four digits, while FIG. 10C shows the sampling region and painting region as a rectangle that is fit to the four points indicated by the user's four digits. Various embodiments may use one or the other method for forming the sampling and painting regions from a gesture-selected quadrilateral; some embodiments may provide a setting whereby a user may select one or the other method to be used. While not shown, some embodiments may support multitouch gestures using more than four digits; for example, a five-digit multitouch gesture may be used to indicate either a pentagonal sampling and painting region or a circular sampling and painting region. Also, in some embodiments, three- and four-digit multitouch gestures may be used to indicate circular regions fit to the three or four points, either as the default behavior or as a user-selectable option.

Figure 11:
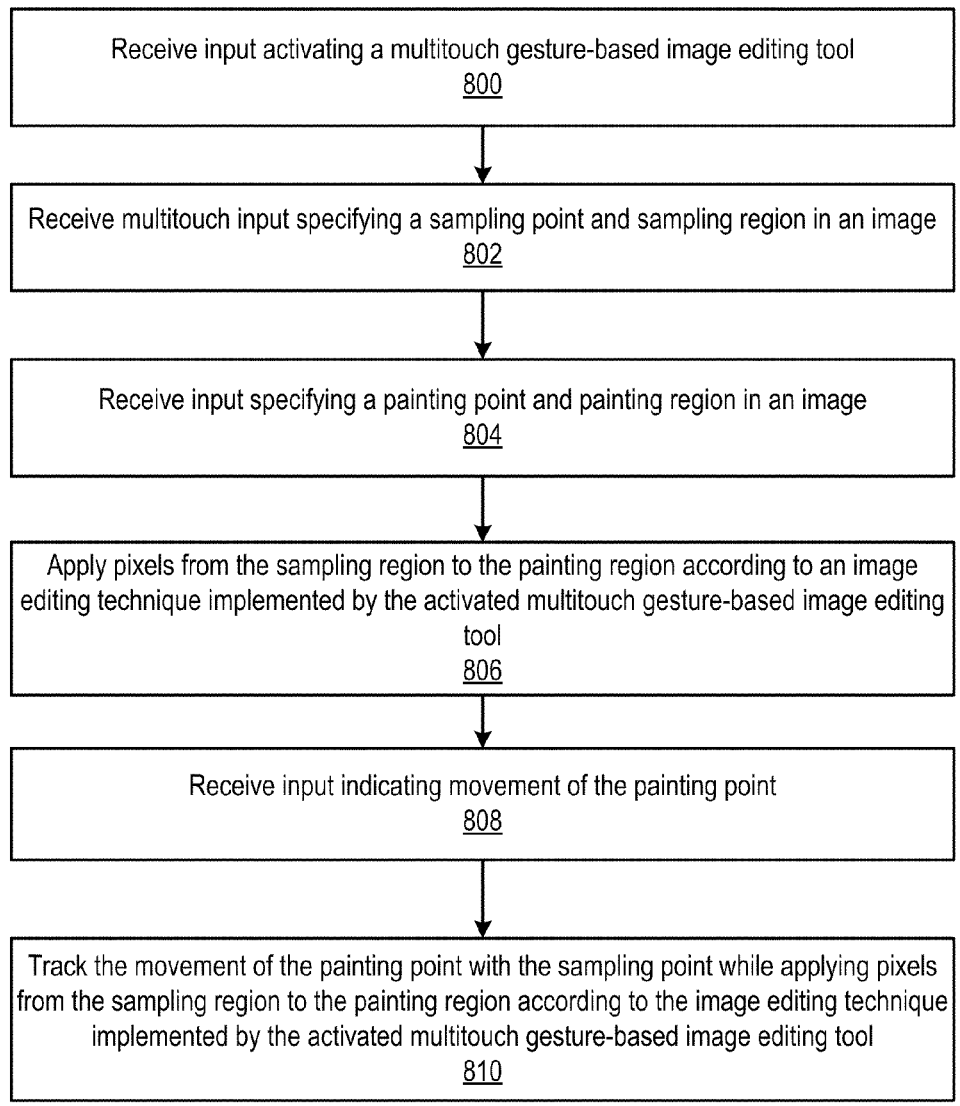
FIG. 11 is a flowchart of a general method for image editing using multitouch gestures according to some embodiments.
Figure 12:
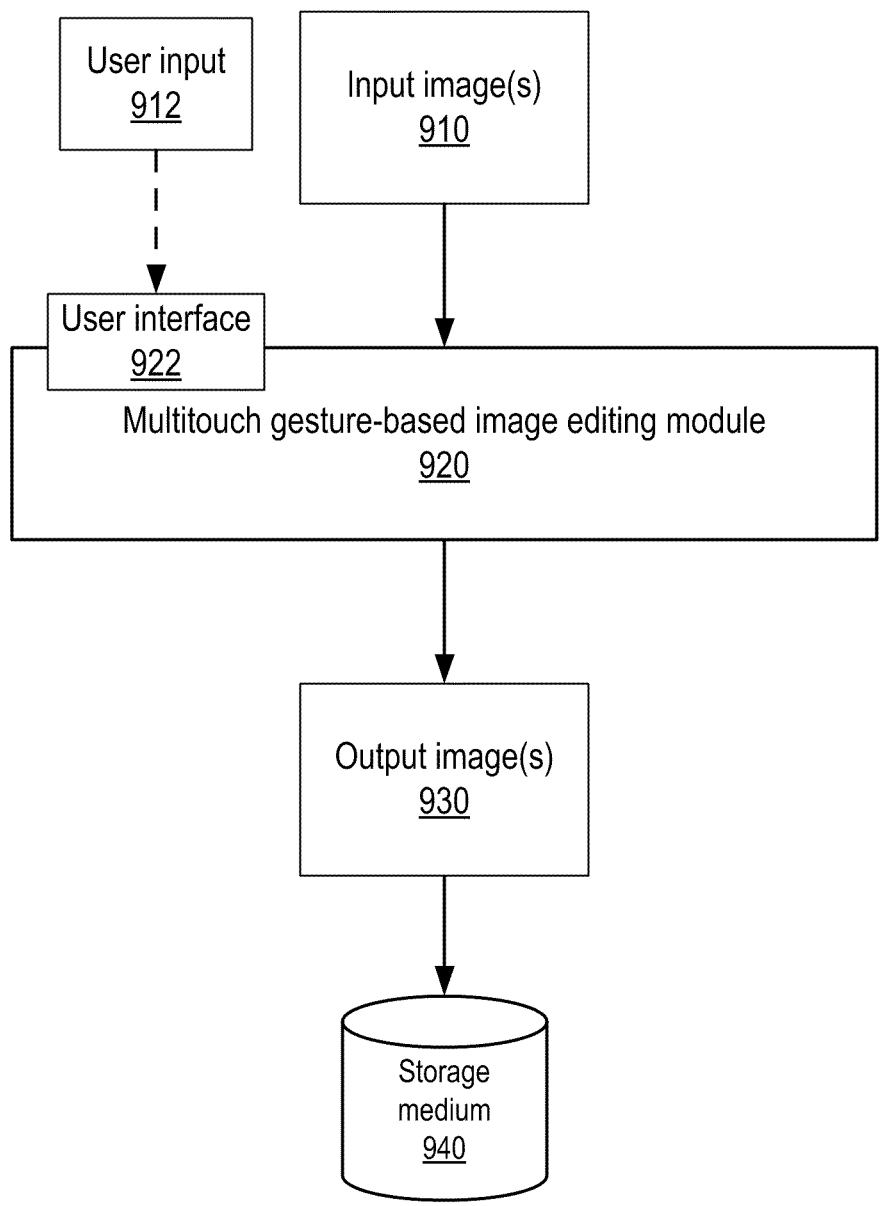
FIG. 12 illustrates a module that may implement one or more multitouch gesture-based image editing tools, according to some embodiments.
Figure 13:
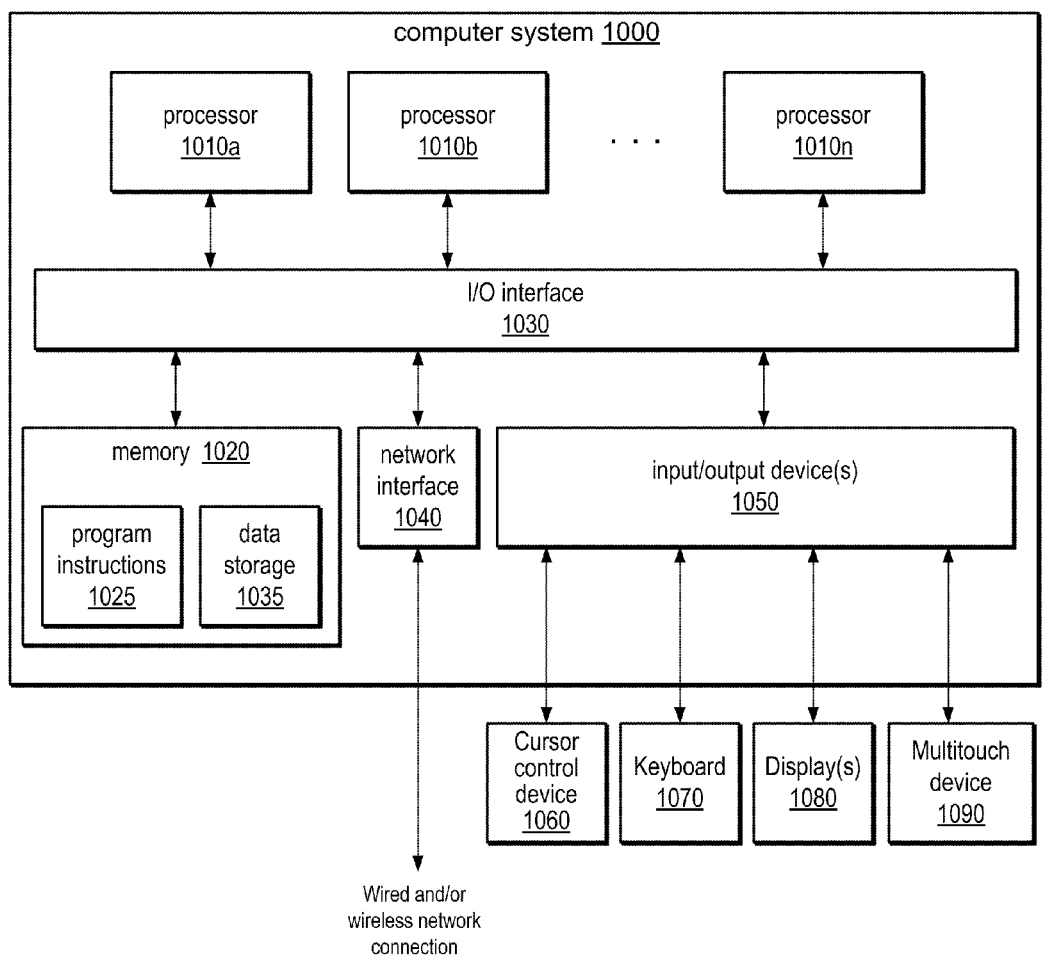
FIG. 13 illustrates an example computer system that may be used in embodiments.

FIG. 11 is a flowchart of a general method for image editing using multitouch gestures according to some embodiments. The method may, for example, be implemented in a gesture-based image editing module. An example of a gesture-based image editing module is shown in FIG. 12. A system on which the method and/or the gesture-based image editing module may be implemented is shown in FIG. 13. As indicated at 800, input may be received that indicates that a multitouch gesture-based image editing tool is to be activated. For example, a user may select a multitouch gesture-based image editing tool from a toolbar, menu, or other user interface element. In some embodiments, a multitouch gesture via a multitouch device may generate the input indicating that the multitouch gesture-based image editing tool is to be activated. In response to the input, the tool is activated.

As indicated at 802, multitouch input indicating a sampling point and sampling region in an image may be received from a multitouch-enabled device. For example, the user may contact the touch-sensitive surface of a multitouch device with multiple digits to specify a sampling point and sampling region. If the multitouch device is able to detect proximity in addition to actual contact, the multitouch input may be generated by multiple digits proximate to the surface. The image may be displayed on the multitouch device, or may be displayed on a separate display device.

As indicated at 804, input specifying a painting point and painting region in an image may be received. For example, the user may contact the touch-sensitive surface of the multitouch device with a digit or stylus to specify a painting point and painting region. As another example, the user may manipulate a cursor with a cursor control device to specify a painting point and painting region. The image in which the painting point and painting region are specified may be the same image as the image in which a sampling point and sampling region were specified, or may be a different image.

As indicated at 806, pixels from the sampling region may be applied to the painting region according to an image editing technique implemented by the activated multitouch gesture-based image editing tool. For example, the technique may be a clone stamp technique, a healing brush technique, a spot healing technique, or some other painting technique.

As indicated at 808, input may be received indicating movement of the painting point. For example, the user may move an index or stylus on the surface of the multitouch device to draw a path along which the user wants the image editing technique applied.

As indicated at 810, the sampling point may track the movement of the painting point, while applying pixels from the sampling region around the current sampling point to the painting region around the current painting point according to the image editing technique implemented by the activated multitouch gesture-based image editing tool. However, note that, for some gesture-based tools, such as the painting tool illustrated in FIGS. 6A and 6B, the sampling point (and sampling region) may be fixed and thus may not track the movement of the painting point.

Example Implementations

FIG. 12 illustrates a gesture-based image editing module that may implement one or more of the multitouch gesture-based image editing techniques and tools illustrated in FIGS. 1A through 11. Module 920 may, for example, implement one or more of a gesture-based clone stamp tool, a gesture-based healing brush tool, a gesture-based spot healing tool, and a gesture-based painting tool. FIG. 13 illustrates an example computer system on which embodiments of module 920 may be implemented. Module 920 receives as input one or more digital images 910. An example image is shown in FIG. 1A. Module 920 may receive user input 912 activating a multitouch gesture-based image editing tool. Module 920 then edits the input image(s) 910, according to user input 912 received via user interface 922, using the activated multitouch gesture-based image editing tool. The user may activate a different multitouch gesture-based image editing tool and further edit the image, and/or may activate other tools and further edit the image. Module 920 generates as output one or more modified images 930. Output image(s) 930 may, for example, be stored to a storage medium 940, such as system memory, a disk drive, DVD, CD, etc.

In some embodiments, gesture-based image editing module 920 may provide a user interface 922 via which a user may interact with the module 920, for example to activate a multitouch gesture-based image editing tool, to perform a selection gesture, and to perform a painting method as described herein. In some embodiments, the user interface may provide user interface elements whereby the user may select options including, but not limited to, the blending mode, opacity, and/or flow. In some embodiments, the user interface may provide user interface elements whereby the user may specify whether the tool is to sample pixels continuously, without losing the current sampling point, even if painting is stopped, or whether the tool is to continue to use the sampled pixels from the initial sampling point each time painting is stopped and resumed. In some embodiments, the user interface may provide user interface elements whereby the user may specify which layers data is to be sampled from and/or painted to. The user interface may provide user interface elements whereby the user may select various other options, preferences, and/or settings for the gesture-based image editing tools.

Example System

Embodiments of a multitouch gesture-based image editing module and/or of the various multitouch gesture-based image editing techniques as described herein may be executed on one or more computer systems, which may interact with various other devices. One such computer system is illustrated by FIG. 13. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, and multitouch-enabled device(s) 1090. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a gesture-based image editing module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a gesture-based image editing module as described herein, and data storage 1035, comprising various data accessible by program instructions 1025. In one embodiment, program instructions 1025 may include software elements of embodiments of a gesture-based image editing module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a gesture-based image editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
receiving selection input indicating multiple substantially simultaneous touch points on a touch-sensitive surface of a multi-touch-enabled device, each of the multiple touch points corresponds to a different point within a source digital image displayed on a display device;
determining, from the selection input, a number of the touch points;
determining, from the number of the touch points, a shape of a sampling region within the source digital image, the sampling region comprising one or more pixels, the shape being one of a plurality of shapes, each shape differentiated, one from another, by a corresponding number of touch points, each number of touch points corresponding with a single shape;
determining a painting region within a destination digital image displayed on the display device, the painting region comprises one or more pixels and has the shape of the sampling region as determined by the number of the touch points; and applying the pixels in the sampling region to the pixels in the painting region according to an image editing technique as defined by movement of a painting point of the painting region.

2. The computer-implemented method as recited in claim 1, wherein the source digital image and the destination digital image are the same digital image.

3. The computer-implemented method as recited in claim 1, wherein the multitouch-enabled device and the display device are the same device.

4. The computer-implemented method as recited in claim 1, wherein the selection input indicates two touch points, and wherein said determining a sampling region within the source digital image comprises determining a substantially circular sampling region from the two touch points.

5. The computer-implemented method as recited in claim 1, wherein the selection input indicates three touch points, and wherein said determining a sampling region within the source digital image comprises determining a substantially triangular sampling region from the three touch points.

6. The computer-implemented method as recited in claim 1, wherein the selection input indicates four touch points, and wherein said determining a sampling region within the source digital image comprises determining a substantially quadrilateral sampling region from the four touch points.

7. The computer-implemented method as recited in claim 1, wherein the selection input indicating the multiple substantially simultaneous touch points is generated by the multitouch-enabled device in response to the multitouch-enabled device recognizing user input comprising multiple substantially simultaneous touches on the touch-sensitive surface of the multitouch-enabled device.

8. The computer-implemented method as recited in claim 1, wherein said determining a painting region comprises:
   receiving painting input indicating the painting point within the destination digital image displayed on the display device; and
   determining the painting region from the painting point.

9. The computer-implemented method as recited in claim 8, wherein the painting input indicating the painting point is generated by the multitouch-enabled device in response to the multitouch-enabled device recognizing input indicating a different touch point on the touch-sensitive surface of the multitouch-enabled device, wherein the different touch point indicates the painting point on the display device.

10. The computer-implemented method as recited in claim 9, wherein the painting input indicating the painting point is generated via a cursor control device in response to the cursor control device recognizing input indicating selection of the painting point on the display device.

11. The computer-implemented method as recited in claim 9, further comprising:
   receiving additional painting input indicating movement of the painting point within the destination digital image;
   adjusting the painting region in accordance with the movement of the painting point; and
   applying the pixels in the sampling region to pixels in the adjusted painting region according to the image editing technique.

12. The computer-implemented method as recited in claim 9, further comprising:
   determining a sampling point within the sampling region;
   receiving additional painting input indicating movement of the painting point within the destination digital image;
   tracking the movement of the painting point with the sampling point in the source digital image;
   adjusting the sampling region and the painting region in accordance with the movement of the sampling point and the painting point; and
   applying pixels in the adjusted sampling region to pixels in the adjusted painting region according to the image editing technique.

13. The computer-implemented method as recited in claim 1, wherein said applying the pixels in the sampling region to the pixels in the painting region according to the image editing technique comprises sampling color values from the pixels in the sampling region and painting over the pixels in the painting region with the sampled color values.

14. The computer-implemented method as recited in claim 1, wherein said applying the pixels in the sampling region to the pixels in the painting region according to the image editing technique comprises sampling color values from the pixels in the sampling region and blending the sampled color values with color values of the pixels in the painting region.

15. The computer-implemented method as recited in claim 1, wherein the sampling region and the painting region are the same region, wherein the region comprises a plurality of pixels, and wherein said applying the pixels in the sampling region to the pixels in the painting region according to the image editing technique comprises sampling color values from at least some of the plurality of pixels in the region and blending the sampled color values with color values of others of the plurality of pixels in the region.

16. A system comprising:
   at least one processor;
   a display device;
   a multitouch-enabled device comprising a touch-sensitive surface, wherein the multitouch-enabled device is configured to recognize multiple substantially simultaneous touch points on the touch-sensitive surface; and
   a memory comprising program instructions, wherein the program instructions are executable by the at least one processor to:
      receive selection input indicating multiple substantially simultaneous touch points on the touch-sensitive surface of a multi-touch-enabled device, each of the multiple touch points corresponds to a different point within a source digital image displayed on the display device;
      determine a number of the touch points included in a selection input;
      determine, from the number of the touch points, a shape of a sampling region within the source digital image, the sampling region comprising one or more pixels, the shape being one of a plurality of shapes, each shape differentiated, one from another, by a corresponding number of touch points, each number of touch points corresponding with a single shape;
      determine a painting region within a destination digital image displayed on the display device, the painting region comprises one or more pixels and has the shape of the sampling region as determined by the number of the touch points; and
      apply the pixels in the sampling region to the pixels in the painting region according to an image editing technique as defined by movement of a painting point of the painting region.

17. The system as recited in claim 16, wherein, to determine a painting region, the program instructions are executable by the at least one processor to:

receive painting input indicating the painting point within the destination digital image displayed on the display device; and determine the painting region from the painting point.

18. The system as recited in claim 17, wherein the program instructions are executable by the at least one processor to:

determine a sampling point within the sampling region;

receive additional painting input indicating movement of the painting point within the destination digital image;

track the movement of the painting point with the sampling point in the source digital image;

adjust the sampling region and the painting region m accordance with the movement of the sampling point and the painting point; and apply pixels in the adjusted sampling region to pixels in the adjusted painting region according to the image editing technique.

19. The system as recited in claim 16, wherein, to apply the pixels in the sampling region to the pixels in the painting region according to the image editing technique, the program instructions are executable by the at least one processor to sample color values from the pixels in the sampling region and painting over the pixels in the painting region with the sampled color values.

20. The system as recited in claim 16, wherein, to apply the pixels in the sampling region to the pixels in the painting region according to the image editing technique, the program instructions are executable by the at least one processor to sample color values from the pixels in the sampling region and blending the sampled color values with color values of the pixels in the painting region.

21. A tangible computer-readable storage medium, excluding signals per se, comprising program instructions stored thereon that, responsive to execution by a computer, cause the computer to perform operations comprising:

determining, from a selection input, a sampling region within a source digital image, the sampling region comprising one or more pixels and the selection input indicating multiple substantially simultaneous touch points detected on a touch-sensitive surface of a multitouch-enabled device;

determining a shape of the sampling region based on a number of the simultaneous touch points, the shape being one of a plurality of shapes, each shape differentiated, one from another, by a corresponding number of touch points, each number of touch points corresponding with a single shape;

determining a painting region within a destination digital image displayed on the display device, the painting region comprises one or more pixels and has the shape of the sampling region as determined by the number of the touch points; and applying the pixels in the sampling region to the pixels in the painting region according to an image editing technique as defined by movement of a painting point of the painting region.

22. The computer-readable storage medium as recited in claim 21, wherein, in said determining a painting region, the program instructions are computer executable to implement:

receiving painting input indicating the painting point within the destination digital image displayed on the display device; and determining the painting region from the painting point.

23. The computer-readable storage medium as recited in claim 22, wherein the program instructions are computer-executable to implement:

determining a sampling point within the sampling region;

receiving additional painting input indicating movement of the painting point within the destination digital image;

tracking the movement of the painting point with the sampling point in the source digital image;

adjusting the sampling region and the painting region in accordance with the movement of the sampling point and the painting point; and applying pixels in the adjusted sampling region to pixels in the adjusted painting region according to the image editing technique.

24. The computer-readable storage medium as recited in claim 21, wherein, in said applying the pixels in the sampling region to the pixels in the painting region according to the image editing technique, the program instructions are computer-executable to implement sampling color values from the pixels in the sampling region and painting over the pixels in the painting region with the sampled color values.

25. The computer-readable storage medium as recited in claim 21, wherein, in said applying the pixels in the sampling region to the pixels in the painting region according to the image editing technique, the program instructions are computer-executable to implement sampling color values from the pixels in the sampling region and blending the sampled color values with color values of the pixels in the painting region.

\* \* \* \* \*